United States Patent [19]

Crockett et al.

[11] Patent Number: 4,646,236

[45] Date of Patent: Feb. 24, 1987

[54] PIPELINED CONTROL APPARATUS WITH MULTI-PROCESS ADDRESS STORAGE

[75] Inventors: Peter N. Crockett, Highland; Robert P. Jewett, Poughkeepsie; Arthur J. Scriver, Wappingers Falls; Thomas A. Tucker, Poughkeepsie, all of N.Y.

[73] Assignee: International Business Machines Corp., Armonk, N.Y.

[21] Appl. No.: 573,225

[22] Filed: Jan. 23, 1984

Related U.S. Application Data

[63] Continuation of Ser. No. 255,074, Apr. 17, 1981, abandoned.

[51] Int. Cl.[4] .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,886,523 | 5/1975 | Ferguson et al. | 364/200 |
| 3,936,803 | 2/1976 | Katzman et al. | 364/200 |
| 4,025,771 | 5/1977 | Lynch, Jr. et al. | 364/200 |
| 4,110,822 | 8/1978 | Porter et al. | 364/200 |
| 4,112,489 | 9/1978 | Wood | 364/200 |
| 4,124,891 | 11/1978 | Weller, III et al. | 364/200 |
| 4,149,242 | 4/1979 | Pirz | 364/200 |
| 4,187,539 | 2/1980 | Eaton | 364/200 |
| 4,225,922 | 9/1980 | Porter | 364/200 |
| 4,228,498 | 10/1980 | Moshier | 364/200 |
| 4,373,180 | 2/1983 | Linde | 364/200 |
| 4,379,328 | 4/1983 | Catiller et al. | 364/200 |

Primary Examiner—Gareth D. Shaw
Assistant Examiner—Daniel K. Dorsey
Attorney, Agent, or Firm—W. S. Robertson

[57] ABSTRACT

Several I/O channel processes time share a data pipeline processor. For each stage of the pipeline, there is a control memory and means for shifting an address from memory to memory as a process in the pipeline proceeds from stage to stage. The number of processes is greater than the number of pipeline stages, and storage is provided for the data and for the addresses while a process is out of the pipeline, waiting to be re-entered for a next pass. A storage array for holding the addresses is arranged to hold addresses for four activity levels for each process. While an address is held in the array it can be modified for the next pass through the pipeline or the process can be switched from a lower priority level activity to a higher level activity.

8 Claims, 13 Drawing Figures

FIG. 2

| CYCLE | P0,4 | P1,5 | P2,6 | P3,7 |
|---|---|---|---|---|
| 1 | P0: LS → 12.3 * | | P6: 14.4 → LS | P7: 12.3 → ALU → 14.4 |
| 2 | P0: 12.3 → ALU → 14.4 | P1: LS → 12.3 | | P7: 14.4 → LS |
| 3 | P0: 14.4 → LS | P1: 12.3 → ALU → 14.4 | P2: LS → 12.3 | |
| 4 | | P1: 14.4 → LS | P2: 12.3 → ALU → 14.4 | P3: LS → 12.3 |
| 5 | P4: LS → 12.3 | | P2: 14.4 → LS | P3: 12.3 → ALU → 14.4 |
| 6 | P4: 12.3 → ALU → 14.4 | P5: LS → 12.3 | | P3: 14.4 → LS |
| 7 | P4: 14.4 → LS | P5: 12.3 → ALU → 14.4 | P6: LS → 12.3 | |
| 8 | | P5: 14.4 → LS | P6: 12.3 → ALU → 14.4 | P7: LS → 12.3 |
| 9 | ← SAME AS CYCLE 1 → | | | |
| 10 | ← SAME AS CYCLE 2 → | | | |

* — READ "Pi: A → B" AS "TRANSFER PROCESS i DATA FROM A TO B"

FIG. 3

| | MEM·30 (LH) | | | | | MEM·30 (RH) | | |
|---|---|---|---|---|---|---|---|---|
| BIT → | 0  2 3 | 7 8 | 17 | | BIT → | 0  2 3 | 7 8 | 17 |
| | SEQ CODE | GP STATS | CONTROL ADDRESS | | | SEQ CODE | GP STATS | CONTROL ADDRESS |

| CYCLE | MEM 30 OPERATION | | INPUT TO | | | | | | | | | |
|---|---|---|---|---|---|---|---|---|---|---|---|---|
| | LH | RH | AR1 | AR2 | AR3 | OR1 | OR2 | OR3 | 12.3 | 14.4 | LS |
| t0 | RD 00 | WR 30 | 00 | 70 | 60 | 70 | 60 | 50 | 60 | 50 | 40 |
| t1 | WR 40 | RD 10 | 10 | 00 | 70 | 00 | 70 | 60 | 70 | 60 | 50 |
| t2 | RD 20 | WR 50 | 20 | 10 | 00 | 10 | 00 | 70 | 00 | 70 | 60 |
| t3 | WR 60 | RD 30 | 30 | 20 | 10 | 20 | 10 | 00 | 10 | 00 | 70 |
| t4 | RD 40 | WR 70 | 40 | 30 | 20 | 30 | 20 | 10 | 20 | 10 | 00 |
| t5 | WR 00 | RD 50 | 50 | 40 | 30 | 40 | 30 | 20 | 30 | 20 | 10 |
| t6 | RD 61 | WR 10 | 61 | 50 | 40 | 50 | 40 | 30 | 40 | 30 | 20 |
| t7 | WR 20 | RD 70 | 70 | 61 | 50 | 61 | 50 | 40 | 50 | 40 | 30 |
| t0 | RD 00 | WR 30 | 00 | 70 | 61 | 70 | 61 | 50 | 61 | 50 | 40 |
| t1 | WR 40 | RD 10 | 10 | 00 | 70 | 00 | 70 | 61 | 70 | 61 | 50 |

PIPELINED CONTROL APPARATUS WITH MULTI-PROCESS ADDRESS STORAGE

This is a continuation of application Ser. No. 255,074 filed Apr. 17, 1981, now abandoned.

BACKGROUND OF THE INVENTION

This invention relates generally to controls for pipelined data processing systems. In prior art pipeline controls known to the present applicants (exemplified by systems disclosed in U.S. Pat. Nos. 3,875,391 and 4,025,771) instructions, for controlling a data processing pipeline which is time-shared by a plurality of processes in a time division multiplex mode, are shifted in bit parallel form through a register pipeline having serially coupled shift stages which are synchronized with and coupled to associated stages of the data pipeline. For a number of reasons, such systems do not efficiently adapt for: varying control activities relative to individual processes as a function of conditions occurring either externally or in the pipeline; handling many processes concurrently (e.g. more processes than the number of stages in the data pipeline); allowing for changes to be made in functions performed in response to a given instruction (which is desirable for supporting "engineering changes" at either the circuit or program level); and/or sustaining multiple different activity tasks per process (which is particularly desirable in a presently disclosed application for controlling computer I/O channels on a pipelined time division basis).

SUMMARY OF THE INVENTION

The present invention seeks to provide more efficient and adaptable control of pipelined data processing systems. In accordance with the present invention an m-stage data processing pipeline (m>1) is controlled by apparatus including m associated control modules, one module associated with each stage of the data pipeline. Each control module comprises: a control memory CM (preferably, but not necessarily, alterable under electronic control, and in normal use operated in a read only mode) which contains $k \times n$ locations for storing control words ($k>1$, $n>m$); an address register AR for addressing locations in the respective control memory; an output register OR for receiving addressed control words which are read out of the control memory; and means coupled between the output register and the associated stage of the data pipeline for controlling operations in that stage in accordance with received control words. A feature of the present invention is that the control memory arrays are dimensioned to store control words having different bit lengths, whereby the control coding for different stages of the data pipeline may be tailored dimensionally to functional requirements of respective stages.

The address registers in the control modules are connected serially to form an m-stage address pipeline having successive stages associated individually with corresponding stages of the data pipeline. Another feature of the subject invention is that a read/write address memory, capable of simultaneously storing up to $k' \times n$ control address words ($k' \geq 1$), is connected to the first register in the address pipeline for supplying a potentially endless stream of control addresses for circulation through this pipeline. Each address supplied by this memory is effective at successive stages of the address pipeline (in successive cycles) to cause control words to be read out relative to respective stages of the data pipeline. Such control words are associated with n discrete processes or circuit channels (hereafter "channels") on a time division basis.

The address memory and its accessing controls are configured to permit new addresses to be written into the memory at the same times that addresses are read out (to the address pipeline). In accordance with the present invention, means coupled to write-in inputs of the address memory permits addresses which are written into that memory to be composed variably in functional association with channel information currently in the data and control pipelines. This feature permits the control sequences for each of n time interleaved channels to be varied dynamically as a function of associated conditions in the address and data pipelines.

Furthermore, the address memory and its controls are configured to address control words associated with plural different "activity level" tasks for each channel, and to be able to efficiently transfer control between task levels of any channel as a function of external and internal conditions. The present configuration permits the subject apparatus to interrupt addressing of control words associated with a given activity level of a channel during any associated cycle of read access to the address memory, address a more time-urgent task relative to another activity level of the same channel, and later resume addressing of the interrupted task with very little "storage overhead" expenditure for saving status information relative to the interrupted and later continued task.

If this system were arranged like prior art systems to directly store and shift control instructions, the required parallel bit width of the associated instruction pipeline would not only be greater than that of the present control address pipeline, but its circuit cost would significantly exceed the combined costs of the present control address pipeline and control modules. Furthermore, systems based upon such direct pipelining of instructions are significantly less flexible than the subject address pipelining configuration; especially in respect to supporting branching of control sequences for tasks in one activity level, and rapid transfers of control between activity levels.

Apparatus in accordance with this invention may be used advantageously, in a manner described herein, to control the various operations of n I/O channels of a computer system.

The foregoing and other objectives, features and advantages of the subject invention will best be understood from the following description when read in conjunction with the accompanying drawings.

BRIEF DESCRIPTION OF THE DRAWINGS

FIG. 2 diagramatically illustrates a typical sequence of (time interleaved and time overlapped) processing operations in the data pipeline of FIG. 1 which can be controlled by the control pipeline of the same figure.

FIG. 3 illustrates allocation of space in the control address memory of FIG. 1 relative to 8 process channels, each having four activity levels.

FIG. 4 illustrates operating sequences of both the subject control apparatus and the associated data pipeline relative to 8 processes, as characterized in FIG. 3.

DETAILED DESCRIPTION

Figure 1:
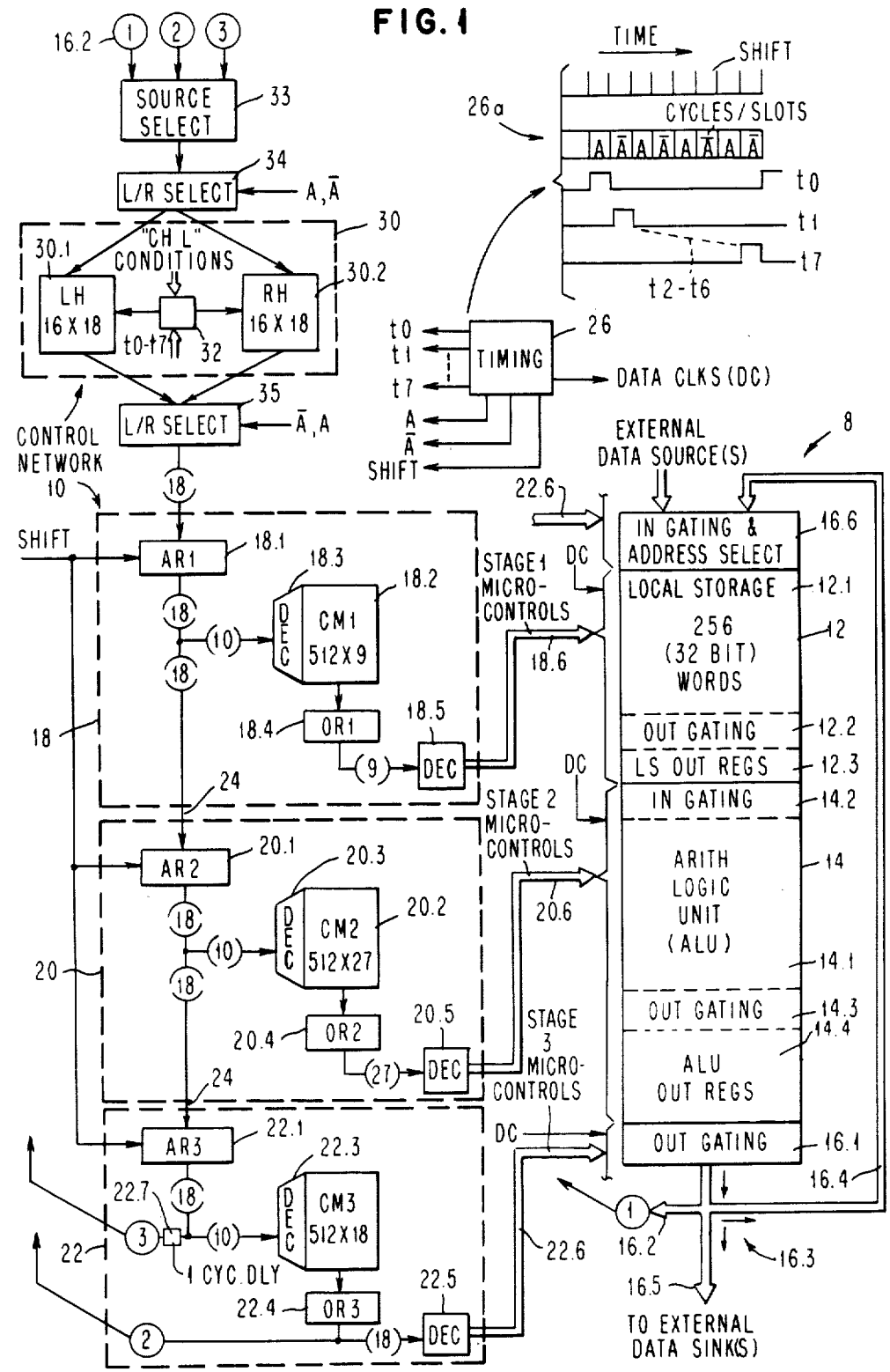
FIG. 1 is a block diagram of a data processing system having corresponding data and control address pipelines in accordance with the present invention.

Referring now to FIG. 1, a system embodying the present invention comprises a pipelined data processing network 8 and an associated control network 10. Network 10 supplies signals for controlling operations in data pipeline 8. Data pipeline 8 contains three (in general m) serially coupled stages 12, 14 and 16 which are respectively controlled by signals produced in serially coupled modular sections 18, 20 and 22 of control network 10. In an application described herein, network 10 is used to control performance of time interleaved and overlapped operations in data network 8 relative to eight (in general n>m) computer I/O channel circuits.

Stages 12, 14 and 16 in the data pipeline successively manipulate data in each of n time division channels which are applied cyclically to the pipeline (from a local store buffer LS contained in stage 12). Typically, each stage may contain plural serially coupled sub-stages which are jointly controlled by the respective section 18, 20 or 22 of network 10. In respect to the computer I/O channel multiplexing application described herein stages 12, 14 and 16 have the illustrated sub-stage constructions. Stage 12 contains a local store LS accessible to external data sources for storing data words associated with n channels, stage 14 contains logic for performing arithmetic and shifting functions relative to data supplied by stage 12, and stage 16 contains registers for latching data developed by stage 14. Outputs of stage 16 are routed selectively to stage 12 local storage, external data sinks, and inputs of network 10.

More specifically, stage 12 includes sub-stages 12.1, 12.2 and 12.3. Stage 12 includes local storage (LS) sub-stage 12.1 which stores data words for each process channel (i.e. in the presently described embodiment, LS stores up to 32 data words in association with each of eight computer I/O channels). Each data word contains four bytes. Sub-stage 12.2 gates (single word) outputs from LS to registers in sub-stage 12.3 which latch such outputs for presentation to various inputs of stage 14.

Stage 14 includes four sub-stages 14.1, 14.2, 14.3 and 14.4. Stage 14.1 comprises an arithmetic logic unit (ALU) for logically manipulating or shifting data words received (one or two at a time) from latching sub-stage 12.4 of stage 12. Sub-stages 14.2 and 14.3 respectively gate "argument" data functions to the ALU and "result" data functions out of the ALUs to sub-stage 14.4.

Stage 16 includes sub-stages 16.1 and 16.6. Sub-stage 16.1 gates data held in sub-stage 16.1 out to various destinations via buses suggested at 16.3. One of these buses, 16.4, provides a "return" link to stage 12 for writing result data into LS. Another bus 16.5 provides a link to external "sink" equipment. A third bus 16.2 provides a link to circuits in control network 10 responsible for composing and storing control word addresses. The latter circuits are discussed below. Sub-stage 16.6 gates inputs to write-in circuits of local store from bus 16.4.

Each modular section 18, 20, 22, in control network 10, comprises six distinct elements: a control address register AR (18.1/AR1 in 18, 20.1/AR2 in 20, 22.1/AR3 in 22), a control memory array CM (18.2/CM1, 20.2/CM2, 22.2/CM3 respectively), an address decoder (18.3, 20.3, 22.3) for decoding address functions shifted into the respective address register, an output register OR (18.4/OR1, 20.4/OR2, 22.4/OR3) for receiving addressed control words from the respective control memory array, a control word decoder (18.5, 20.5, 22.5) for producing discrete control signals in response to control words in the respective output register OR, and lines (18.6, 20.6, 22.6) for applying such control signals to the associated stage of the data pipeline (12, 14, 16) for controlling performance of various data manipulation operations in the associated stage.

Notably, the address registers AR1–AR3 have identical bit widths, for accomodating 10-bit addresses (these registers are each 18 bits wide, but 8 bit portions of each are employed to shift non-addressing control bits which are discussed later), whereas the control memory arrays CM1–CM3 are dimensioned to store control words having different bit lengths (e.g. 9 bits in CM1, 27 bits in CM2 and 18 bits in CM3). This feature of varied bit dimensionality in the control memory arrays permits large numbers of control word bits to be handled efficiently with minimal aggregate circuit cost. For instance, in the embodiment presently being described, each 10-bit address circulating through AR1–AR3 controls selection (and time staggered usage) of 54 control word bits—9 bits in CM1, 27 bits in CM2, and 18 bits in CM3—with less circuitry than would be required if the same 54 bits were centrally stored and directly pipelined.

Registers AR1–AR3 are serially coupled, as indicated at 24, to form a 3-stage "address" shifting pipeline. Addresses shifted into AR1 cyclically, from a source memory discussed later, control selections of control words in CM1 relative to stage 12 in data pipeline 8. With each entry of an address into AR1, an address previously entered into AR1 is shifted into AR2, to control selection of a control word in CM2 relative to stage 14 in pipeline 8, and an address previously held in AR2 is shifted into AR3, to control selection of a control word in CM3 relative to stage 16 in the data pipeline. Addresses applied to AR1 in successive cycles are associated with eight time multiplexed control channels. Such addresses are shifted through AR1–AR3 in coordination with movement of associated data through data pipeline 8. Such shifting is controlled by "shift" signals shown at 26a, which are produced cyclically by clock circuits 26. Circuits 26 also produce cycle distinguishing signals t0–t7, having the form suggested at 26a, which are used in a manner described below.

The signals t0-t7 are associated with different minor cycles, or time division slots, within repeating major cycles or time division frames. Each frame spans eight minor cycles during which data associated with each of eight process channels is manipulated once through pipeline 8. In each minor cycle registers AR1-AR3 simultaneously contain addresses, associated with three different process channels, which respectively designate control word locations in CM1-3 for readout to respective control registers OR1-OR3.

As previously noted, addresses are shifted cyclically through AR1-AR3 (at minor cycle intervals). A source memory 30, discussed later, supplies these addresses to AR1. As each address is transferred into AR1, the address previously in AR1 is shifted into AR2 and the address previously in AR2 is shifted into AR3. In each cycle, the addresses in AR1-AR3 respectively control selections of associated control words, from CM1-CM3, for readout (simultaneously) to OR1-OR3. These control words are decoded (via circuits 18.5, 20.5, 22.5) to control data manipulations in associated stages (12, 14 and 16) of the data pipeline 8 (simultaneously). In successive minor cycles of each major cycle addresses associated with eight different channels are applied successively to AR1, and act successively, through AR1-AR3, to control manipulations of associated data in stages 12, 14 and 16 of the data pipeline.

As noted previously, registers AR1-AR3 in the illustrated embodiment are each 18 bits wide, but employ only 10 bits for addressing the respective control memory arrays CM1-CM3. The other 8 bits are used for (later-described) sequence verification and auxiliary control functions relative to associated process channels. However, for convenience, the 18-bit units of information which are shifted through AR1-AR3 are referred to herein as address words.

In accordance with the present invention, "address memory" 30 stores address words associated with eight (in general, n) circuit channels (also referred to herein variously as processes or channels) which time share pipeline 8 and control apparatus 10. In successive minor cycles, address words are read out of memory array 30 in association with different channels, and applied to first stage AR1 in the address pipeline. As an address associated with channel i (i=0,1,2, ..., 7) is read out to AR1, an address associated with channel i−1 (modulo 8) is shifted into AR2, an address associated with channel i−2 (modulo 8) is shifted into AR3, and an address associated with channel i−5 (modulo 8) is written into memory 30. Each address written into memory 30 is composed selectively as a function of control information in OR3, data in pipeline 8 and address information in AR3.

Memory 30 includes two simultaneously accessible sections; a 16-word "left half" (LH) section 30.1, associated with four of the eight process channels, and a 16-word "right half" (RH) section 30.2 associated with the other four channels. In the present embodiment LH and RH have groups of four word spaces exclusively dedicated to their associated channels, each space of each group being exclusively dedicated to a unique one of four different activity level tasks performable for the associated channel. Examples of activity level tasks associated with such dedicated spaces will be given later.

Alternate minor cycles of operation of memory 30 are distinguished as odd and even cycles. Memory 30 and circuits 32 are organized to read out LH and write into RH in even cycles and to write into LH and read out RH in odd cycles. This action is so controlled that spaces in LH and RH dedicated to successive numbered channels are read out and written in the succession of channel numbering. Consequently, in each major cycle addresses associated with channels 0-7 are transferred out of memory 30 into AR1-AR3 in succession, and "new" addresses associated with these channels are written into memory 30 in succession (on a delayed basis relative to readouts relative to respective channels).

New addresses written into RH and LH are "composed" by selection and register circuits 33 and selection circuit 34. Circuit 33 receives inputs selectively from one or more of three sources associated with circled symbols 1-3 and registers the results. The connection represented by symbol 1 links an input of circuit 33 to bus 16.6 which connects to stage 16 of the data pipeline. The connection associated with symbol 2 links circuit 33 to the output of control word register OR3. The connection associated with symbol 3 connects the output of register AR3 to a staged register (22.7) to circuit 33.

In each minor cycle, circuit 33 selectively forms an 18-bit word function to be written into array 30, and switching circuit 34 steers such functions, in alternate cycles, to write-in lines of LH and RH. Each word function written into LH or RH is stored in a space associated with the channel whose data has just passed through stage 16 in the data pipeline. By the action of circuits 33 each word function written into LH or RH is composed in part as a function of information in a currently effective control word (in OR3), and in part as a function of information issuing either from stage 16 of the data pipeline or from register AR3. This will be explained later in more detail, with reference to FIG. 5. Such composition permits newly written addresses to be varied conditionally as a function of the current service control state of the associated process, and/or the "in-transit" data of the associated process, or both; thereby allowing for considerable flexibility in selection of control sequences. Advantages of this will become evident as this description progresses.

In the overall operation of control network 10, address words associated with successive numbered channels are cyclically read out from memory 30 and shifted through AR1-AR3. In each (minor) cycle control words associated with three time-contiguous channels are simultaneously read out of CM1-CM3, at locations specified by (10 of the 18 bits in) respective registers AR1-AR3, and decoded by respective decoder circuits (18.5, 20.5, 22.5). Control signals produced by these circuits are applied cyclically (via respective output lines (18.6, 20.6, 22.6), to respective stages (12, 14, 16) in the data pipeline to control manipulations of data in respective channels.

Consequently, each address word shifted through AR1-AR3 (over a series of 3 minor cycles) acts in three successive cycles, relative to CM1-CM3, to produce control words for successively manipulating data of an associated channel in stages 12, 14 and 16 in the data pipeline. And in each major cycle (eight minor cycles) addresses associated with eight channels are shifted through AR1-AR3, on a time-interleaved basis, each controlling a series of 3 data manipulation operations relative to the associated channel. And these operations are overlapped in time so that in each minor cycle data associated with 3 channels, having contiguous service time slots, is manipulated simultaneously in stages 12, 14 and 16.

FIG. 2, discussed next, illustrates the timing of operations in the data pipeline relative to eight process channels denoted Pi(i=0,1,2, ..., 7). FIG. 4, discussed later, illustrates operations in both the data pipeline 8 and control network 10 relative to the eight process channels, and relative to plural activity level task functions in a representative channel (P6).

In a "first" minor cycle (cycle 1) data functions respectively associated with channels P0, P7, and P6, are respectively applied to registers 12.3 from LS (local store 12.1), to ALU 14.1 from registers 12.3, and to write-in inputs of LS from registers 16.1. In the next minor cycle (cycle 2) P0 data is applied to ALU 14.1, P7 data is written into LS, and P1 data is transferred from LS to registers 12.3. In the next cycle (cycle 3) P2 data is applied to 12.3, P0 "result" data is stored in LS, and P1 data is applied to 14.4 and ALU 14.1. In cycle 4, P3 data is entered into 12.3, P1 result data is stored in LS, and P2 data is applied to 14.4 and ALU 14.1. In cycle 5, P4 data is entered into 12.3, P2 data is stored in LS, and P3 data is applied to 14.1 and the ALU. In cycle 6, P5 data is entered into 12.3, P3 data is stored in LS, and P4 data is latched at 14.4 and applied to the ALU. In cycle 7, P6 data is applied to 12.3, P4 data is stored in LS and P5 data is applied to 14.4 and the ALU. In cycle 8, P7 data enters the pipeline at 12.3, P5 data is stored in LS, P6 data is latched at 14.4 and applied to the ALU.

Thus, at different minor cycle phases of each major cycle, data associated with each of the eight channels, P0-P7, is read out from LS into the data pipeline, applied to the ALU, latched in output stage 14.4 and written into LS; and this pattern of operations is repeated regularly, for each channel, at major cycle intervals. The number of process channels which can be served in this manner is a function of the capacities of local store 12.1, and memories CM1-CM3 and 30, and of any critical timing requirements pertaining to the individual process channels.

For reasons which will become clear as this description develops, it is desirable to be able to perform plural different (and potentially unrelated) tasks relative to each process channel, and to be able to adaptively switch back and forth between such tasks (hereafter activity levels) on an interruptable basis. For example, in a computer I/O channel application which will be more fully described later, each channel sharing the subject pipelines is associated with one I/O channel interface, between peripheral equipment and a central computing complex, relative to which plural different activity level tasks must be performed on an interruptable basis (e.g. tasks to support retrieval of chained commands and tasks to support more time-urgent functions associated with communication of data bytes to or from the associated interface).

Figure 8:
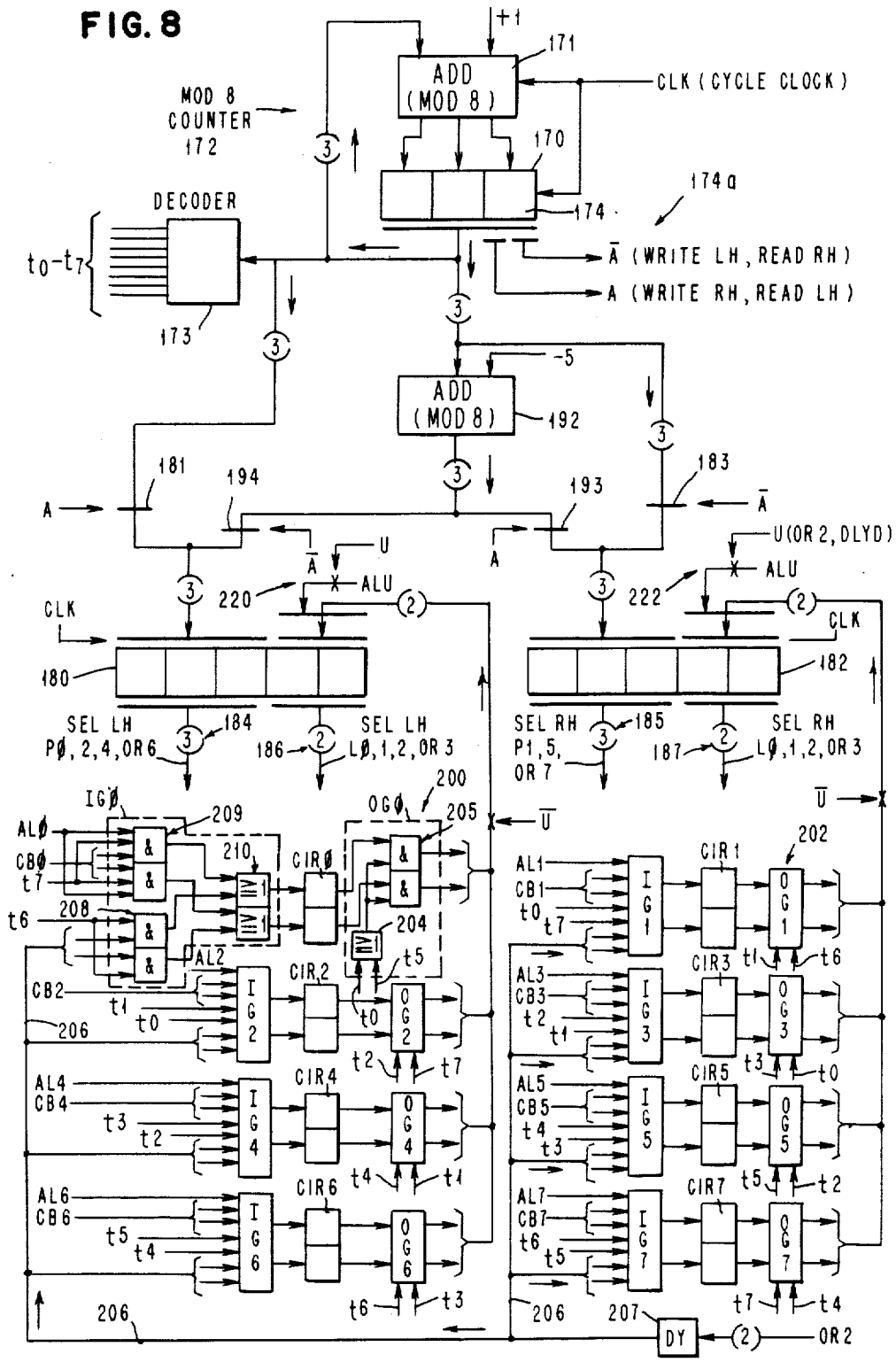
FIG. 8 illustrates the controls 32 for accessing the subject address memory 30.

Because of the time which would be required to store status relating to an interrupted sequence, it would be inefficient to perform such tasks by simple sequence branching techniques. Accordingly, memory 30 and its access controls 32 have been organized to permit efficient transfers between such tasks, whereby different activity levels of one channel may be apportioned operating time in the pipelines (10 and 8) in suitable relation to the time urgency of conditions arising at the respective channel interface and in external networks linked to that interface. For this purpose, each channel has a respective group of four word storage spaces uniquely dedicated to its operations, in memory 30, and individual word spaces within each group are dedicated for addressing control functions associated with different activity level tasks in the associated channel. The access controls 32 are logically adapted for varying access to such dedicated spaces so as to efficiently serve each activity level while also efficiently preserving status relative to any interrupted levels. FIG. 3, discussed next, shows the organization of spaces in LH and RH. FIG. 8, discussed later, shows the logic of controls 32.

Referring to FIG. 3, LH and RH, respectively shown at 30.1 and 30.2, each contain sixteen word storage spaces arranged in horizontal rows. Each word space contains 18 bit storage positions. Word spaces in LH are dedicated to even numbered channels 0, 2, 4 and 6 and word spaces in RH are dedicated to odd numbered channels 1, 3, 5 and 7. Each channel has four word spaces in LH or RH uniquely dedicated to that channel. The four uppermost spaces in LH are dedicated to channel 0, the next four to channel 2, the next four to channel 4 and the last four to channel 6. The top four spaces in RH are dedicated to channel 1, the next four to channel 3, the next four to channel 5, and the last four to channel 7. The four spaces dedicated to each channel are associated with control of four different activity level tasks relative to the respective channel; such activity levels hereafter being labelled L0, L1, L2 and L3 (in reference to FIGS. 3 and 12).

As previously noted, each word space in LH and RH can store an 18-bit function; in which 3 bits (bits 0-2) represent a sequence code function, 5 bits (bits 3-7) represent status bit functions (GP stats), and 10 bits (bits 8-17) represent an address code function for addressing locations in CM1-CM3. The sequence code bits are used (in a manner to be described with reference to FIG. 6) to verify correct sequencing of control activities for channels having contiguous service time slots. The GP stat bits are used as auxiliary control bits (through circuit paths to be desribed with reference to FIG. 7). The address code functions are used for addressing control words in CM1-CM3 (through paths to be described with reference to FIG. 5).

FIG. 4 illustrates operations in control network 10 and data pipeline 8 relative to the multi-level organization shown in FIG. 3. Minor cycles, indicated in the column at the extreme left of this figure, repeat at major cycle intervals of eight cycles. Successive minor cycles, are associated with successive timing signals ti (i=0, 1, ..., 7) produced by circuits 26 (FIGS. 1 and 8), which have the form shown at 26a (FIG. 1).

The second digit of each two-digit entry in FIG. 4 represents an activity level numbers, the first digit represents a channel, and the entry itself represents a particular function relative to that level and channel. For instance under "Inputs To AR1, AR2, AR3", the entries 00, 70 and 60 in the first row represent (18-bit) address functions associated with levels 0 of channel/processes P0, P7 and P6. The entry RD00 in the second column of this row indicates that the word read into AR1 is read out of memory 30 section LH. Naturally, the entry to AR2 is shifted from AR1 and the entry to AR3 is shifted from AR2.

Entries "70", "60" and "50" under "Inputs To OR1, OR2, OR3", in the first (t0) row in FIG. 4, indicate control word functions read out of CM1, CM2 and CM3 into respective registers OR1, OR2 and OR3 (offset in time from respective latching actions in AR1-AR3) relative to level (L) 0 functions in channels P7, P6 and P5 respectively (from locations in CM1-CM3 designated by 10-bit address code terms held in respective address registers AR1-AR3). In other words, entry "70" represents a control word associated with L0 in channel P7, entry "60" represents a control word associated with L0 in P6 and "50" represents a control word associated with L0 in P5.

Entries "60", "50" and "40" under "Activity In Data Pipeline", in first cycle/row t0 represent data functions associated with levels L0 in channels P6, P5 and P4, which are latched during that cycle in respective stages 12, 14 and 12.1 of the data pipeline during cycle t0 (under control of signals derived from the decoding of corresponding control words CW60, CW50 and CW40 then latched in OR1-OR3). Data "60" is data associated with L0 in P6 which has been read out of local storage LS and latched at 12.3. Data "50" is result data developed from argument data associated with L0 of P5 which has been transferred from registers 12.3 through the ALU and latched at 14.4. Data "40" is previous cycle result data associated with L0 of process P4 and transferred from 14.4 into local store 12.1. Finally, under "Input to RH" row t0 indicates that a control address function "30" associated with L0 of P3 is written into the RH section of memory 30 (naturally, in a space dedicated to L0 of P3).

In the next minor cycle t1: control address functions, respectively pertaining to levels L0 in channels 1, 0, and 7 are respectively shifted into AR1, AR2 and AR3 (function "10" from RH, function "00" from AR1 and function "70" from AR2); control word functions associated with levels L0 in channels 0, 7 and 6 are respectively read out of CM1, CM2 and CM3, and latched in OR1, OR2 and OR3; and data functions associated with levels 0 of channels 70, 60 and 50 are respectively latched at 12.3, 14,4 and in local store (LS). Furthermore, as indicated under "Memory 30", during this cycle address functions pertaining to activity levels 0 of channels 40 and 10 are respectively written into LH and read out of RH.

In successive minor cycles t2-t5 address functions respectively pertaining to activity levels 0 of respective processes 2-5, are read out alternately from LH and RH and shifted into AR1; each address function causing associated control words to be read out of CM1-3 in successive cycles and associated data to be manipulated in data pipeline stages 12, 14 and 16 in successive cycles. And while these functions are being performed, it can be seen (by referring to entries in rows t2-t5, under columns LS, LH and RH) that data respectively pertaining to activity levels 0 of processes 6, 7, 0 and 1 are successively written into local store LS, and address functions respectively pertaining to activity levels 0 of processes 5, 6, 7 and 0 are alternately written into RH and LH sections of memory 30.

The entry for minor cycle t6 illustrates a level change in channel 6 which exemplifies level change in any channel. In this cycle, an address function "61", associated with activity level 1 of channel 6, is read out from LH to AR1 (whereas during the preceding major cycle activity level 0 of channel 6 had been served, and an associated address function "60" had been stored in LH during minor cycle t3). This causes an associated control word function "61" to be read out of CM1 to OR1 in cycle t7, and associated data "61" to be read out of LS and latched at 12.3 in the next t0 cycle. This culminates in the next t1 cycle with entry of "new" "61" address information into LH and in the next t2 cycle with entry of associated "61" ("result") data into LS.

Accordingly, it may be appreciated that in each major cycle one selectable activity level of each channel is given one complete round of service action in the subject pipelines, and the level selected to be served can be changed, from one major cycle to the next, merely by selecting a control address word associated with a different level during the minor cycle in which the associated channel is given readout access to memory 30. Since the information required to resume processing in any interrupted level is the last address written into LH or RH and the last input to LS before the level switchover (next major cycle readout), there is effectively no time penalty for switching between levels and returning to interrupted levels, and the circuit and storage overhead associated with such switching is effectively minimized.

Figure 5:
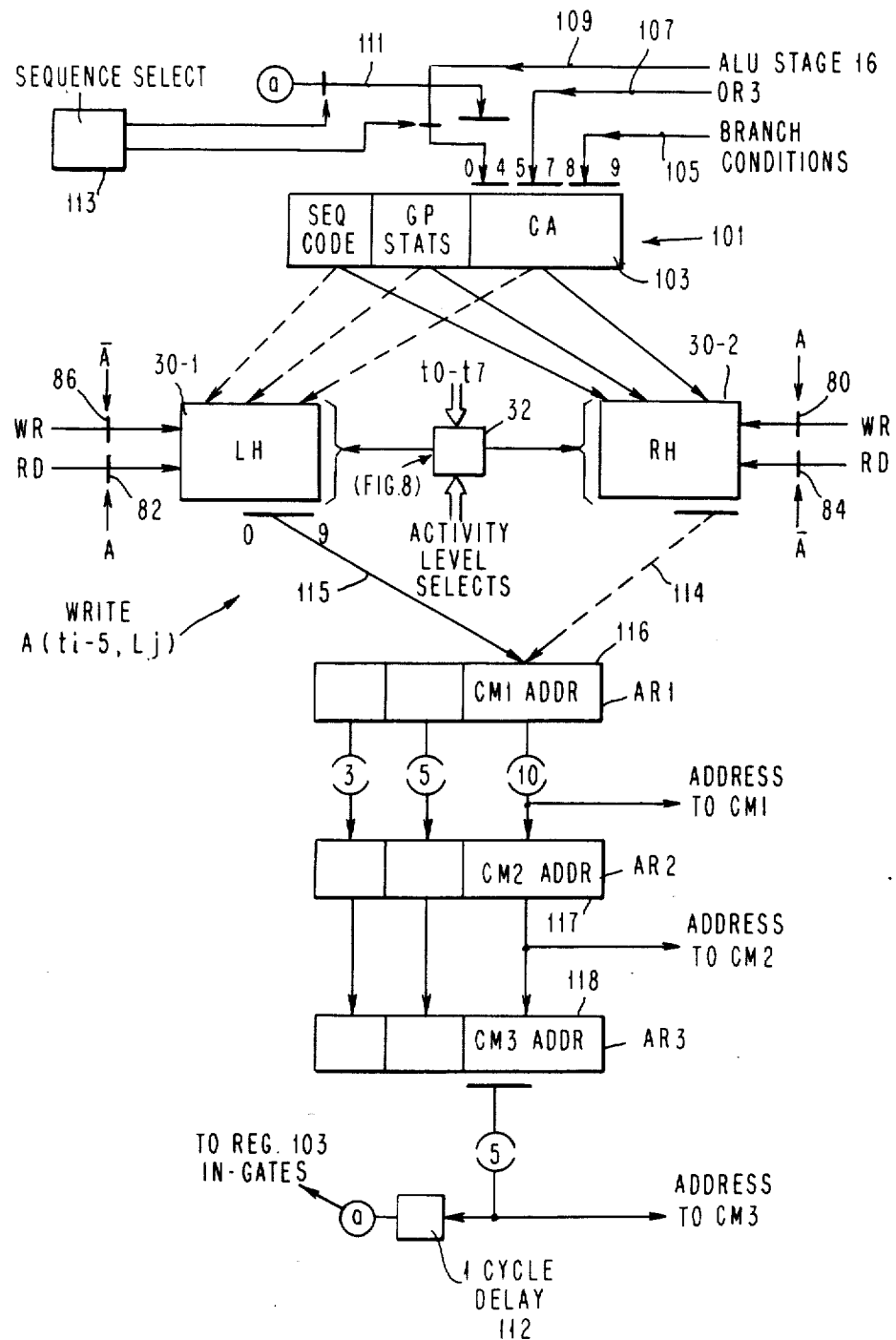
FIG. 5 illustrates portions of the subject control address memory and address pipeline devoted exclusively to circulation of control address information.

As noted previously, each word read out of memory 30 consists of a ten-bit address term, a three-bit sequence code term and five "GP Stat" bit functions. FIG. 5 shows how the address code terms are circulated and utilized in control network 10, and FIGS. 6 and 7 respectively show how the sequence codes and GP stat bits are circulated and used.

Referring to FIGS. 1 and 5, signal function A (shown at 26a in the upper right hand part of FIG. 1) is "up" or enabling during "even" cycles t0, t2, t4 and t6, and its complementary function $\overline{A}$ is up or enabling during odd cycles t1, t3, t5 and t7. Signals A and $\overline{A}$, when enabling, act through gates 80 and 82 to respectively condition RH to operate in a write-in mode (WR) and LH to operate in a read-out mode (RD) Signals $\overline{A}$, when enabling, act through gates 84 and 86 to respectively condition RH for readout and LH for writing. Accordingly, during even cycles addresses associated with even numbered channels are read from LH and addresses associated with odd numbered channels are simultaneously written into RH (see also FIG. 4), and during odd cycles addresses associated with even and odd channels are respectively written into LH and read out of RH.

As suggested in FIG. 5, 18-bit address words are staged in register 101 before being written into LH or RH. The ten bits which form the address code part of each such word are staged in a 10-bit portion 103 of register 101. Two bits of each input to register portion 103 are received from not shown branch condition triggers via lines 105, three bits of each input are received from OR3 via lines 107 (i.e. from a control word previously read out of CM3), and five bits are received selectively either through lines 109 or lines 111. Lines 109 connect to the output of stage 16 in the data pipeline (see FIG. 1) and lines 111 connect to the output of address register AR3, delayed one cycle at 112, via a connection represented by the circled symbol "a". The selection between lines 109 and 111 is made by circuit 113, which represents a switch controlled by a CM2 microcode function decoded at 20.5 (FIG. 1) in the previous cycle.

During each cycle ti (i=0, 1, . . . , 7), a selectively composed 18-bit word associated with a channel which has just completed a round of service in the data pipeline is entered into register 101, and another word previously latched in register 101 is written into a word space in LH or RH dedicated to its associated channel (see FIG. 3). Word spaces in LH or RH are selected under control of access control circuits 32 which will be described later in connection with FIG. 8. The ten-bit address code part of each word written into LH or RH is passed from portion 103 of register 101 into a corresponding portion of the dedicated space in LH or RH.

In each cycle, while a word is being written into LH or RH, another (18-bit) word associated with another channel is simultaneously read out of another location in the opposite memory section, RH or LH (under control of the access control circuits 32 to be described). The 10-bit address part of each word read out of RH or LH is transferred, via lines 114 and 115, to a corresponding 10-bit portion 116 of register AR1. At the same time, previous cycle contents of register portion 116 are shifted to a corresponding portion 117 of register AR2 and previous cycle contents of register portion 117 are shifted to a corresponding portion 118 of register AR3. In each cycle address codes in respective register portions 116–118, of AR1-AR2, associated with three different process channels, are applied simultaneously to respective control memory arrays CM1-CM3 causing control words to be read out of associated locations in these arrays and applied to respective stages 12, 14 and 16 of data pipeline 8.

Figure 6:
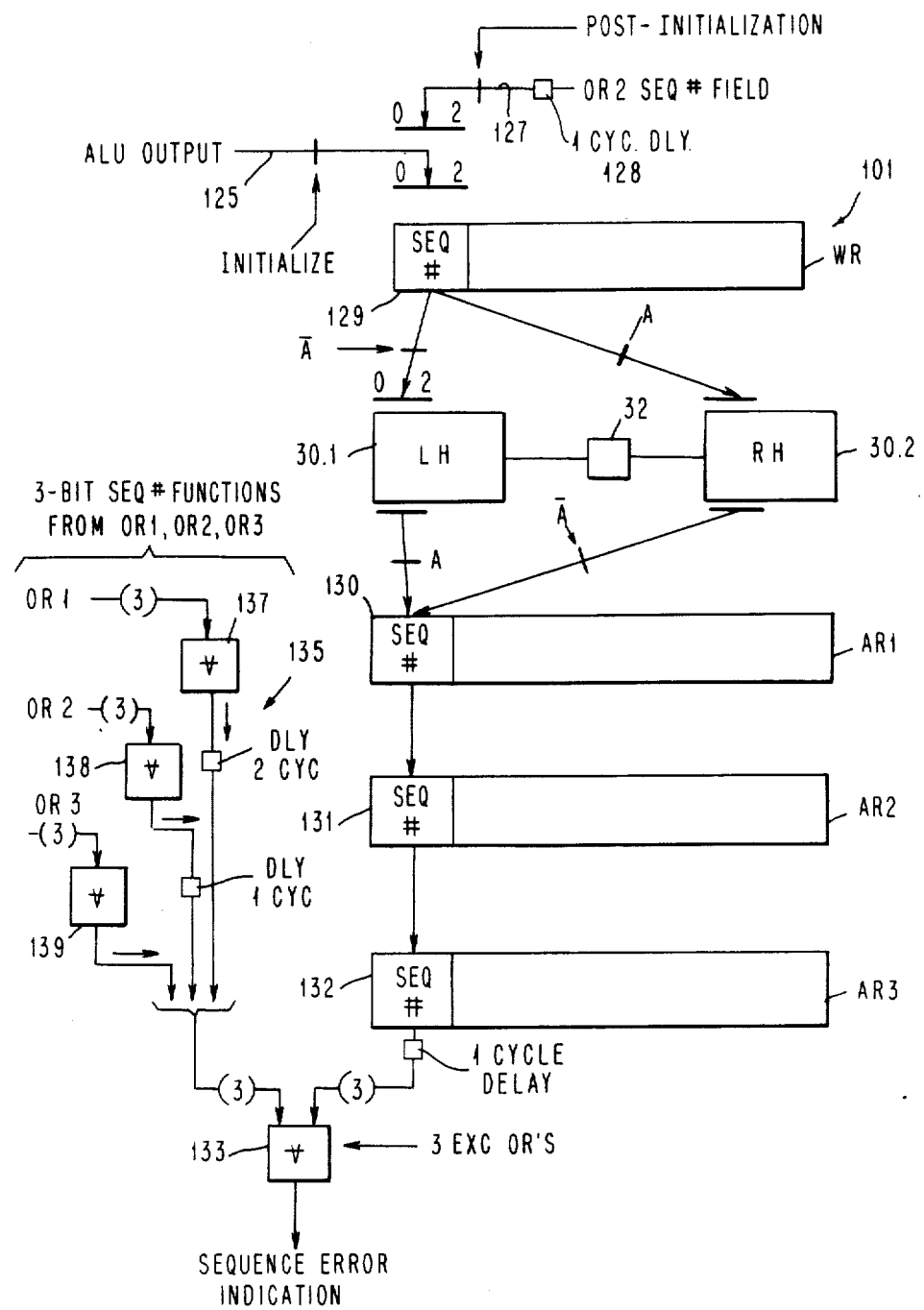
FIG. 6. illustrates portions of the subject control address memory and address pipeline devoted exclusively to circulation and utilization of sequence verification information.

FIG. 6 shows how sequence number information is circulated in and utilized by network 10. In each minor cycle three bits representing a sequence number function—derived initially from an external source through the data pipeline, via gated connection path 125, and subsequently from the output of OR2 via gated connection path 127 and a 1 cycle delay (register) 128—are transferred into associated portion 129 of register 101 (in parallel with 15 other bits then entering the remainder of register 101). In each cycle a sequence number previously staged at 129 is written into LH or RH at a location determined by access controls 32. At the same time, another sequence number function is read out of the opposite memory section, RH or LH, into a corresponding portion 130 of AR1, and other sequence number functions are shifted respectively from portion 130 of AR1 to a corresponding portion 131 of AR2, and from portion 131 to a corresponding portion 132 of AR3.

In each cycle the sequence number in (section 132 of) AR3 is compared, via exclusive OR comparators 133 and logic 135, to sequence number functions derived from currently decoded outputs OR1, OR2 and OR3 (FIG. 1). Logic 135 forms exclusive ORs of sequence number functions taken from OR1-3, in three exclusive OR circuit 137, 138 and 139. Circuits 137 provide the exclusive OR3 of 3 bits presented at OR1 and produce an output representing a "1" value if an odd number of these bits have "1" values. Circuits 138 compare 3 bits presented at OR2 and produce a "1" values output if an odd number of the compared bits have "1" values. Circuit 139 does the same for correspondingly positioned bits presented at OR3.

The outputs of circuit 137 (delayed two cycles), circuit 138 (delayed one cycle) and circuit 139 (undelayed) are compared to the 3 output bits of section 132 (delayed one cycle) in exclusive-OR circuits 133. The outputs of circuits 133 effectively indicate whether or not the (three) different channels associated with the sequence numbers in OR1-OR3 have proper sequential time relationships to each other. The utility of this is that correct functioning of the entire control network (10) can be verified by this single check, eliminating the need to have individual checks of the various parts of the network.

Figure 7:
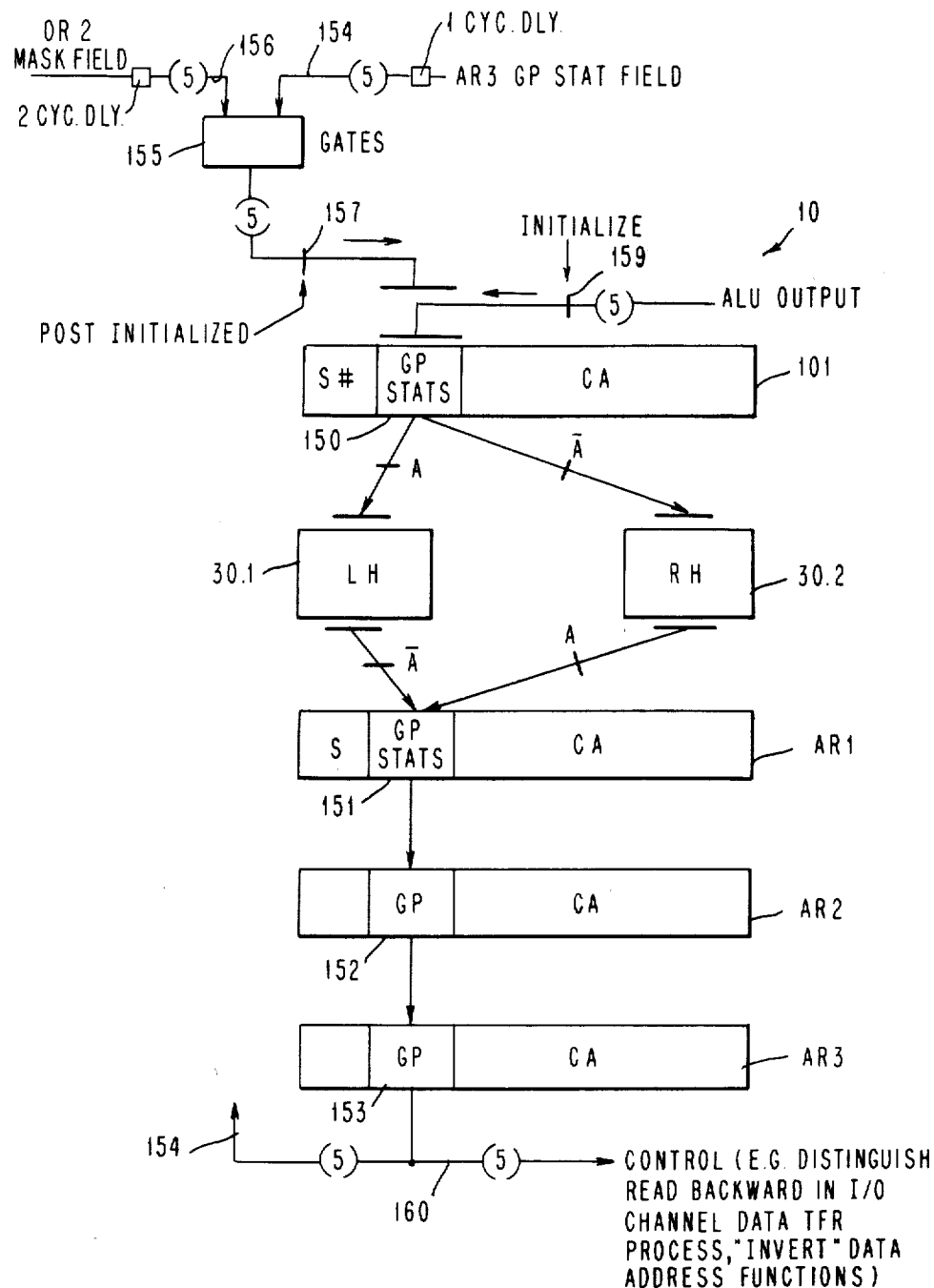
FIG. 7 illustrates portions of the subject address memory and address pipeline devoted exclusively to circulation and utilization of general purpose status information (GP STATS).

FIG. 7 shows the circulation path and utilization of GP Stat bits. In association with address code and sequence number functions, GP Stat bits are cyclically staged in portion 150 of register 101 and written alternately into LH and RH. Thereafter, these GP Stat bits are read out of LH and RH and shifted through respective portions 151, 152, and 153 of AR1-AR3. From section 153 individual GP Stat bits are selectively recirculatable to register 101 via lines 154 and 1 stage of delay, bit masking gates 155 (shown at the top of FIG. 7), and selection gates 157. The bit masking gates are individually controlled by (programmed) mask bits received from control register OR2 via lines 156 and 2 stages of delay. When respective mask bits are permissive and selection gates 157 are enabled the GP Stat bits are entered into section 150 of register 101. Gates 157, which are normally enabled, are disabled at particular times, associated with initialization of conditions in individual process channels. At such times other gates 159 are activated to connect an external source to register section 150 via the data pipeline (see "External Data Source" inputs; FIG. 1).

GP Stat bits currently in section 153 of AR3 are applied to the data pipeline, via lines 160, to augment control functions associated with the outputs of OR-1-OR3. As indicated in FIG. 7, such GP Stat functions may be utilized in relation to I/O channels (described later) to distinguish between Read and Read Backward command operations.

FIG. 8 illustrates a preferred embodiment of controls 32 for addressing memory 30. Register 170, in combination with "add one" circuit 171, forms a modulo 8 digital counter 172. In each minor cycle, a 3-bit count number in register 170 is increased by 1 (modulo 8) in adder circuit 171, under control of cyclic clock pulses CLK, and the increased value is latched in register 170. Circuits 173 cyclically decode count values held in register 170 and produce the minor cycle timing signals t0–t7 shown at 26a in FIG. 1 (and discussed previously relative to FIG. 4). The lowest order bit stage 174, in register 170, provides outputs at 174a representing the previously discussed timing signals A and $\overline{A}$, respectively associated with even and odd cycles (refer to discussions of FIGS. 1, 4 and 5).

In even cycles the contents of register 170 are transferred to a high order portion of register 180, via gates 181, and in odd cycles such contents are transferred to a high order part of register 182 via gates 183. Registers 180 and 182 respectively address LH and RH in each minor cycle. The three high order bits in these registers, acting through respective lines 184 and 185 and not shown decoding circuits, respectively address channel group locations in respective memory sections LH and RH (these 3 bit functions are each capable of addressing eight channel groups but in the present embodiment LH and RH have only four groups, and only 2 of the 3 bits are used). The two low order bits in registers 180 and 182, acting through respective lines 186 and 187 and not shown decoders, respectively address one of four (activity level) locations in the respective sections LH and RH, within the group selected by the 3 higher order bits in the same registers. Thus, in each cycle, a 5-bit term in register 180 addresses a location in LH dedicated to one of four activity levels (L0, L1, L2, or L3) of one of four even channels (P0, P2, P4 or P6), and a 5-bit term in register 182 addresses an RH location dedicated to one of four activity levels of one of four odd channels (P1, P3, P5 or P7).

As indicated at 174a, during "even" minor cycles t0, t2, t4 and t5, commonly associated with "on" states of A, RH is operated in a write mode and LH is operated in a readout mode; and during "odd" minor cycles t1, t3, t5 and t7, associated with on states of $\overline{A}$, LH is written and RH is read out.

As noted previously, in even cycles the modulo 8 cycle count number in register 170 is transferred directly to register 180 via gates 181, and in odd cycles the cycle count is transferred directly to register 182 via gates 183. In each cycle, the cycle count value in register 170 is also passed through (algebraic) adder-circuit 192 which subtracts 5 (modulo 8) from the cycle count value. In even cycles, outputs of adder 192 are transferred to register 182 via gates 193. In odd cycles outputs of adder 192 are applied via gates 194 to register 180. Consequently, in even cycles representations of the cycle count and the cycle count minus 5 are respectively applied to registers 180 and 182, and in odd cycles representations of these functions are respectively applied to registers 182 and 180.

This results in the channel addressing sequence suggested in FIG. 4. For instance, in even cycle t0 a 0 cycle count applied to LH (via registers 170 and 180) causes an address associated with channel 0 to be read out of a channel 0 location in LH, and an address value of 3 applied to RH (via register 170, adder 192 and register 182) causes an address associated with channel 3 to be written into RH. As another example note that in odd cycle t5 a channel 5 location in RH is read out in response to a cycle count of 5 (applied to RH via register 182) and a channel 0 location in LH is written in response to an access value of 0 applied to LH (via adder 192 and register 180) which is 5 less than the cycle count (modulo 8).

As noted previously, the two lowest order bits in registers 180 and 182 respectively address specific activity level positions in LH and RH, within channel position groups addressed by the high order bits in the respective registers. These low order bits are supplied to the respective registers cyclically by respective source circuits 200 and 202 shown in the lower portion of FIG. 8.

Circuits 200 comprise four 2-bit registers CIR0, CIR2, CIR4, and CIR6, which are respectively associated with even channels 0, 2, 4, and 6. Circuits 202 comprise four 2-bit registers CIR1, CIR3, CIR5 and CIR7, which are respectively associated with odd channels 1, 3, 5 and 7. Each CIR has associated, and correspondingly numbered, output and input gating circuits OG and IG. The circuits IG0 and OG0 associated with CIR0 are shown in detail. The circuits associated with the other CIR's are identical to those associated with CIR0.

The OG circuits connect outputs of respective CIR's to registers 180 and 182 during predetermined minor cycles. Register 180 is connected to CIR0 by OG0 during t0 and t5, to CIR2 by OG2 during t2 and t3, to CIR4 by OG4 during t4 and t1, and to CIR6 by OG6 during t6 and t3. Register 182 is connected to CIR1 by OG1 during t1 and t6, to CIR3 by OG3 during t3 and t0, to CIR5 by OG5 during t5 and t2, and to CIR7 by OG7 during t7 and t4.

Thus, "activity level addresses" in CIR's 0, 2, 4, and 6 are respectively transferred to register 180 during even cycles t0, t2, t4, and t6, for addressing LH for readout, and such addresses are respectively applied to register 180 from CIR's 4, 6, 0 and 2, during odd cycles t1, t3, t5, and t7, for addressing LH when LH is being written. Also, activity level addresses in CIR's 1, 3, 5, and 7 are used to address RH, via register 182 during respective odd cycles t1, t3, t5, and t7, when RH is read out, and addresses in CIR's 3, 5, 7 and 1 are used to address RH via register 182 respectively during t0, t2, t4, and t6, when RH is written.

This also conforms to the access arrangement suggested in FIG. 4, which indicates: reading out of LH locations associated with even channels 0, 2, 4, and 6 (into AR1) during t0, t2, t4 and t6 respectively; writing into LH positions associated with even channels 4, 6, 0 and 2 during t1, t3, t5 and t7 respectively; reading out of RH positions assigned to odd channels 1, 3, 5 and 7, during t1, t3, t5 and t7 respectively, and writing into RH positions for odd channels 3, 5, 7 and 1 during t0, t2, t4 and t6 respectively.

As indicated in a representative form for OG0, each outgating circuit OGi consists of an OR circuit 204 and a pair of AND circuits 205 respectively enabled at ti and ti+3, via OR circuit 204, for transferring the contents of the associated CIRi to the associated register 180 or 182.

As suggested in FIG. 8, each ingating circuit IGi operates prior to the associated outgating circuit OGi, in associated minor cycles ti−2 and ti−1, to transfer level address information to respective registers CIRi from various sources described hereinafter. Such transfers effectively control switching between activity levels. Each IGi is conditioned to pass information to the associated CIRi only after that CIR has been outgated (to register 180 or 182) in association with a write-in access (to LH or RH) and only before outgating of the same CIRi in association with a readout access.

Accordingly, when LH or RH is accessed for readout, at ti, the activity level position which is addressed is defined by information transferred from CIRi at ti and such information is always entered into CIRi in an immediately preceding cycle ti−1 or ti−2. Furthermore, any location in LH or RH which is accessed for readout at ti will also invariably be re-accessed five cycles later, at ti+5 (mod. 8), when the respective memory section LH or RH is accessed for writing. Consequently, a transfer of control between activity levels of one channel can occur only after an address associated with the last serviced activity level has been written into memory 30; this action effectively preserving the information required for subsequently resuming service in any activity level which may be interrupted by such transfer of control.

As suggested in FIG. 8, "activity level address" information is presented to each ingating circuit IGi from a bus 206 common to all IG's and from "condition bit" sources CBi individually associated with CIRi. At ti−2 IGi passes signals from bus 206 to CIRi, and in the next cycle, ti−1, IGi is conditioned to pass CBi to CIRi if an associated "allow" control bit ALi is enabling. Bus 206 connects, via a plural-cycle delay circuit 207, to a 2-bit portion of the output of register OR2 (FIG. 1). Delay 207 delays activity level address information in channel i control words from the time of the appearance of such information in OR2 to the next time ti−2 at which the associated IGi operates to sample bus 206.

Referring to FIGS. 4 and 8, positions in memory 30 assigned to channel i are accessed for readout in cycles ti and for write-in five cycles later, in cycles ti+5. Since associated ingates IGi are sampled, for potential activity level switching action, in cycles ti−2 and ti−1, such switching action can occur only after a currently serviced activity level of channel i has been granted a full round of readout and write-in access to memory 30.

As representatively illustrated in FIG. 8 relative to IG0, each ingating circuit IGi contains a pair of AND gates 208, operated at $ti-2$, for sampling information on bus 206, and a pair of AND gates 209, operated at $ti-1$ if ALi is enabling, for conditionally sampling the associated condition bits CBi. Gates 208 and 209 in each IGi are coupled to inputs of CIRi via respective OR gates 210. When gates 209 are operated information transferred from CBi to CIRi is written over any information which may have been transferred from bus 206 to CIRi in the previous cycle $ti-2$ (by gates 208).

Condition bit sources CBi and allow signal sources ALi include not-shown latches. The CBi latches are manipulatable as a function of external level addressing conditions in the associated channel. The ALi latches may be set by programmed signals passed from OR2 (via not-shown circuits including a plural-cycle delay).

If no previously interrupted or inactive activity level requires service CIRi is usually set to address 00 (for addressing the space in LH or RH dedicated to activity level 0 of channel i). With the exception of certain special circumstances discussed later, if ALi is disabling at $ti-1$ (i.e. when gates 209 of IGi are potentially operated) the address transferred via bus 206 in the preceding minor cycle is preserved in CIRi. However, if ALi is enabling at $ti-1$ the address transferred to CIRi from bus 206 at $ti-1$ is overwritten by the address contained in CBi.

While a given activity level of channel i is being serviced (in the data pipeline) an associated control word is arranged to transfer an activity level address to CIRi; via OR2, delay 207, bus 206 and IGi (by the microprogrammer responsible for the design of the control coding in CM2). This may be a "repeated" address for re-accessing the activity level served in the previous major cycle (if that level requires further immediate action), or it may be a different address. Accordingly, activity level switching may be instigated either by the control word microcode of a level currently being served (via CM2, OR2, delay 207, bus 206, IGi and CIRi) or in response to external conditions (via CBi).

Additional gated inputs to the low order (activity level address) stages of registers 180 and 182 are shown at 220 and 222 respectively. These are controlled (by parameter U) and used for initialization functions described next.

Figure 9:
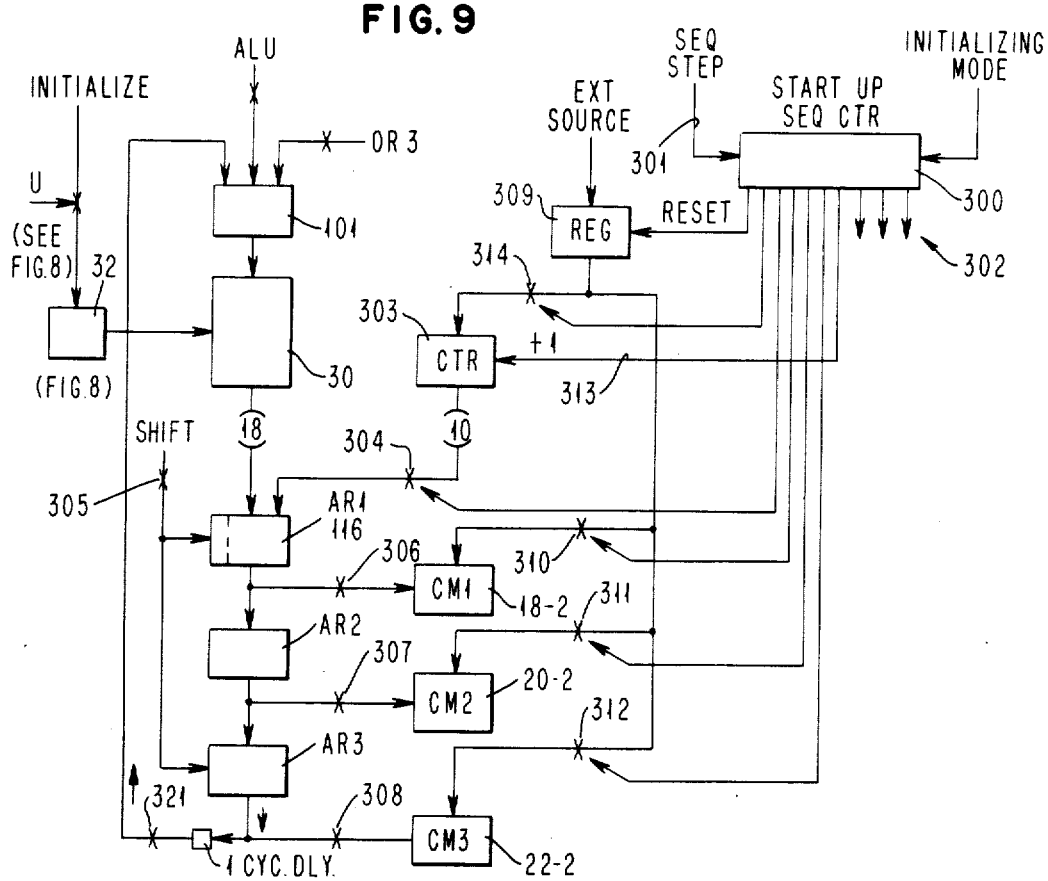
FIGS. 9 and 10 respectively illustrate circuit means and operating sequences for initializing the subject control address memory (30) and control memories (18-2, 20-2, 22-2).
Figure 10:
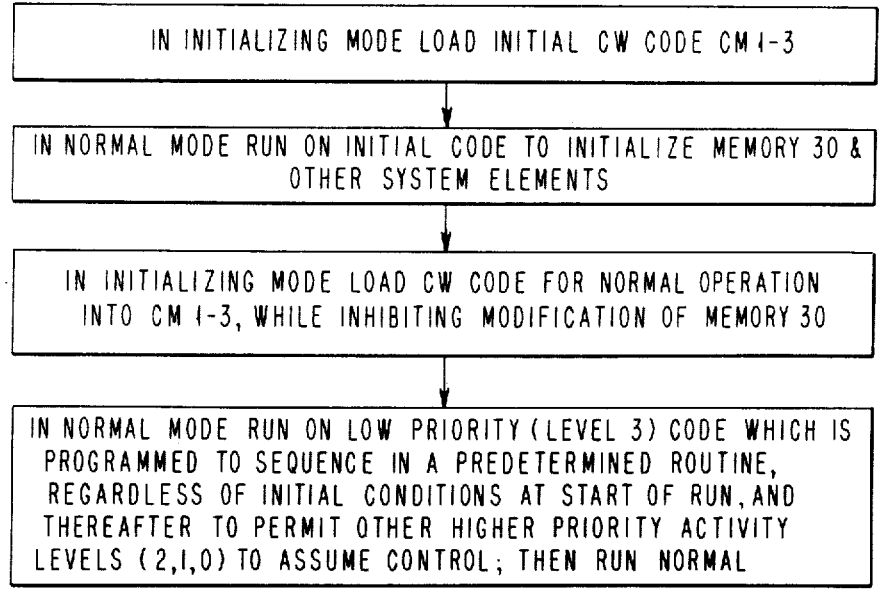

FIG. 9 illustrates circuits for initializing the control circuits of FIG. 1 (memory 30 and CM1-CM3) on an automatic basis. FIG. 10 broadly characterizes the initialization operation. It should be understood that the method of initialization which will now be described is not directly relevant to the present invention (which pertains to the system embodying these memories and its "normal" productive mode of operation), and that this description is being given only for the sake of completeness. Furthermore, those skilled in the art will appreciate that "automatic" operations described below could also easily be controlled manually, and not excessively degrade the productive utility of the system.

The initialization process may be viewed as having five discrete phases: (a) a reset phase in which resets applied to all latch and trigger elements in control network 8 and data pipeline 10 (via not-shown means) establish predetermined initial states in these elements, including conditioning of CIR's 0-7 (FIG. 8) for addressing level 3 locations in memory 30; (b) a first initialization phase (established at conclusion of the reset phase) in which apparatus described with reference to FIG. 9 controls the loading of a first set of control word functions into CM1-CM3 (for controlling the next phase) and in which initial address functions are loaded into level 3 locations in sections LH and RH of memory 30; (c) a pre-operational phase in which the system runs under control of timer 26 and the first set of functions in CM1-CM3 (FIG. 1) to perform initializing functions serving to complete the loading of "starting address" functions (including sequence number functions and GP Stat functions) into all level locations of LH and RH and of preliminary "data" functions into LS; (d) a second initialization mode phase, set up at the conclusion of the preoperational phase, in which CM1-CM3 are reloaded with "functional" microcode for controlling the next phase; and (e) a final or "normal" operational phase in which the system runs productively in its "normal" mode.

Referring to FIG. 9, after the above-mentioned reset phase, apparatus including start-up sequence counter 300 operates in an initializing mode for conducting the above-mentioned first initialization phase operations. Step signals received at 301 step counter 300 through a predetermined sequence of states associated with activations of auxiliary control lines 302. Signals on lines 302 control loading (writing) of control word information into CM1-CM3 in a manner described below (CM1-CM3 are assumed here to be writable stores; however, those skilled in the art will recognize that they also could be unchangeable type stores, with information permanently stored corresponding to the information loaded during this phase).

In the initializing mode CM1-CM3 are conditioned for writing operations, and counter 303 is operated intermittently to supply counts which represent successive addresses to AR1, via gates 304. Between transfers of successive addresses to AR1, shift pulses are applied to AR1-AR3, via gates 305, causing the same address to be stored successively in each of the registers AR1-AR3. In coordination with these actions, gates 306, 307 and 308 are operated, to apply this address sequentially to CM1-CM3, and control word information supplied from an external source is sequentially written into CM1-CM3, via register 309 and gates 310-312. This fills corresponding locations in CM1-CM3, defined by the applied address, with predetermined control word information.

After loading the CM3 location counter 303 is incremented, via line 313. The incremented value is transferred to AR1-AR3 as before, and then control word information is loaded into the associated locations in CM1-CM3. This process repeats until all locations of CM1-CM3 have been filled in this manner.

Sequence counter 300 also may be operated in a modified initializing mode whereby only selected portions of CM1-CM3 are filled. In this modified mode a selected starting address value (supplied externally) is set into counter 303, via register 309 and gates 314, and the above address shifting and control word writing operations are performed relative to a predetermined number of address locations in CM1-CM3.

As noted previously, in the preferred embodiment CM1-CM3 are permitted to have different dimensions for storing control words of different lengths. As shown in the exemplary configuration of FIG. 1, CM1 stores 9-bit control words, CM2 27-bit control words and CM3 18-bit control words. For loading this configuration it is convenient to arrange register 309 to write control word information in 18-bit units, and to configure the gating paths 310–312 and the sequencing of counter 300 so that locations in CM1–CM3 associated with a single address state of counter 303 are filled in three sequential steps; the CM1 location (9 bits) and a one-third portion of the CM2 location (9 bits) in a first step, the rest of the CM2 location (18 bits) in a second step, and the CM3 location (18 bits) in a third step.

When all positions in CM1–CM3 have been filled (count in counter 303 equals capacity of each CM), CM1–3 are conditioned for "read only" operation, and controls 300 are operated to initialize arrays LH and RH in memory 30. Circuits 32, in particular CIR's 0–7 (FIG. 8), have previously been initialized (in the reset phase) to address locations "3" (binary 11) in memory 30—i.e. locations dedicated to activity levels 3 of each channel—during the reset phase. At this time, a predetermined address is externally supplied to AR1, via register 309 and counter 303, and normal clocking propagates this address through AR1–3, and through the gates 321 into the position in memory 30 assigned to level 3 of a channel. Under normal clocking counter 172 (FIG. 8) is incremented cyclically, causing the same address to be written into all other level 3 positions of memory 30. At the conclusion of these operations the system is conditioned for conducting the "pre-operational" phase.

In this mode the network 10 (FIG. 1) is permitted to operate in normal mode using the control functions previously loaded into CM1–CM3. These functions are addressed (by the addressing functions previously written into level 3 locations) and control writing into other level locations in memory 30 (other than the level 3 locations pointed to by the level functions presently contained in the CIR's). This is done by forcing other level addressing functions into registers 180 and 182 (FIG. 8), via circuits 220 and 222 (FIG. 8), and ALU stage 16. The complement of the function U, which controls circuits 220 and 222, the OG's and registers 180 and 182 so that path is disabled during this action. Using this mechanism, micro-instructions running in level 3 can initialize the address function data in (any or all of the level locations in) memory 30 to predetermined values. After a predetermined number of major cycles memory 30 is fully initialized. Then these operations continue until all other initializations are completed (for instance LS initialization).

At this point the initializing mode is restored, and the operations for loading CM1–3 are repeated, this time loading CM1–3 with microcode for controlling "productive" operations in the data pipeline. Thereafter, predetermined address functions are supplied externally to AR1–3 and the access controls 32 are again initialized for entering level 3 locations in memory 30.

Now the system is restored to normal mode, and level 3 microprograms are sequenced in each channel 0–7 in an idling loop discussed later. As external conditions are varied in any channel, the corresponding CIR address is modified under control of the associated CB functions and normal productive channel operations are executed as described later.

Figure 11:
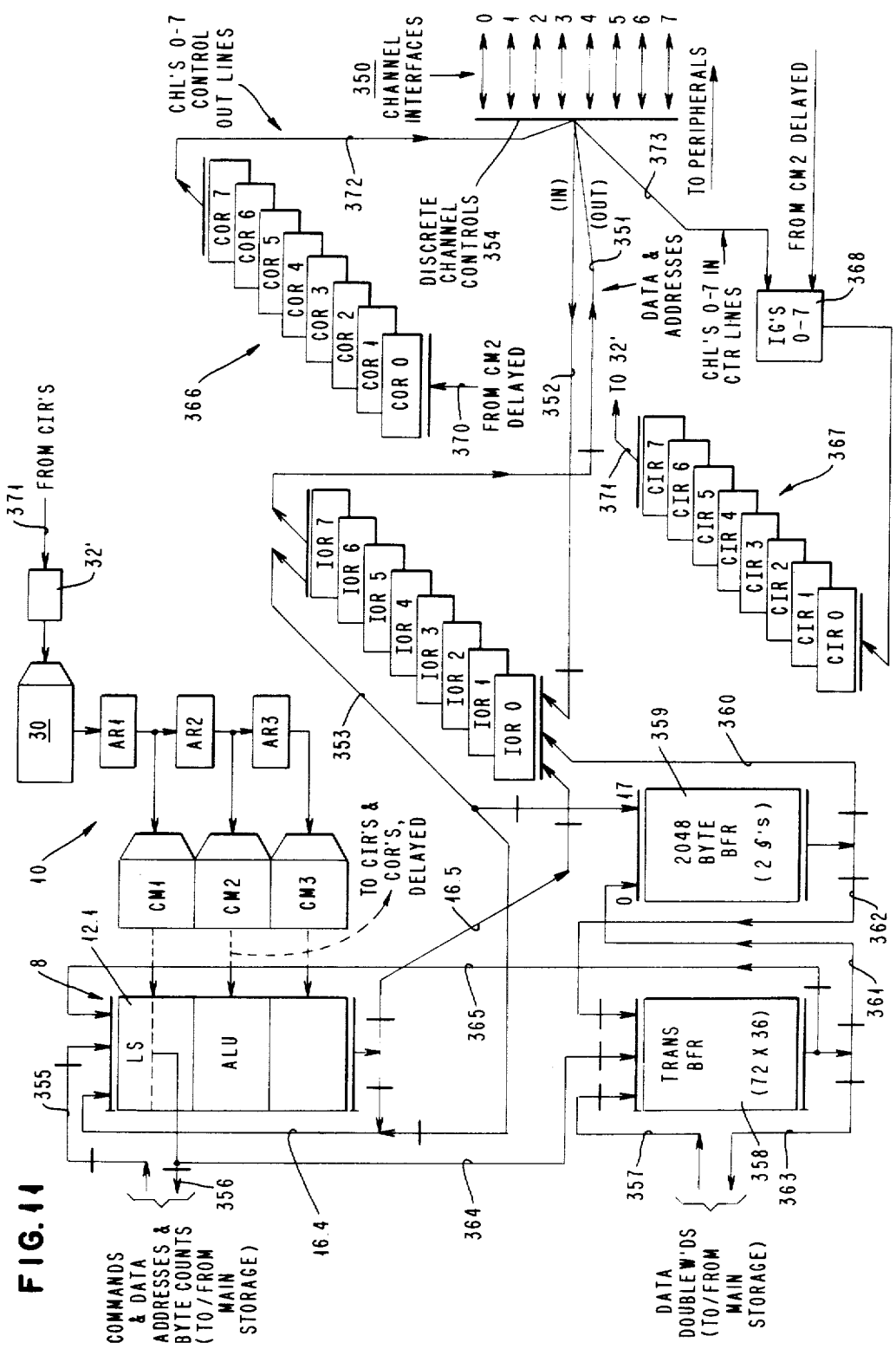
FIG. 11 illustrates the application of the present invention relative to a group of 8 computer I/O channels.

FIG. 11 illustrates schematically how the subject invention is integrated into a data processing network to control operations of multiple I/O channels (in the illustration 8 channels), in a time division mode, between a not shown central computing complex and not shown peripheral device controllers. FIG. 12, discussed later, contains a sequence flow diagram illustrating how various operations relative to a single one of the I/0 channels are controlled by the subject apparatus (at major cycle intervals).

In FIG. 11 data pipeline 8 and control pipeline 10 are as described previously in reference to FIG. 1. Outputs from tne last stage 16 in the data pipeline are steerable, via time-shared bus 16.5, to one of the eight "I/O Registers" IOR0–IOR7. These IOR's are associated individually with the above-mentioned I/O channels, and connect to control unit interfaces 350 of respective channels via individual (per channel) buses 351 and 352. The IOR's also share a common bus 353, which connects to the "feedback" bus 16.4 of data pipeline 8, for transferring information to the LS stage of the data pipeline. The channels also have separate interface control circuits suggested schematically at 354, which are not relevant to the present invention. Transfers of signals between pipeline 8 and the IOR's are controlled by outputs of control pipeline 10.

One function performed via the data pipeline 8 and its connecting buses 16.5 and 353 is to transfer device address and command information from LS (local store) 12.1 to the channel interfaces 350 via the IOR registers. Another function performed via the pipeline 8 is to receive device address and status information in LS via the interfaces 350 and the IOR's. The command and address information forwarded from LS to the IOR's is received initially, via external bus 355, from not shown common control apparatus interfacing-with not shown central processing equipment. Such apparatus and equipment are not relevant to this description. Also, the status information received by LS from the IOR's is passed to the not-shown common apparatus and central equipment via external bus 356.

The IOR's are also used to buffer input and output data in transit between the main storage of the not-shown central equipment and the channel interfaces 350. Output data (outbound to the interfaces 350) is received from the main storage, via external bus 357, and passed to the appropriate IOR through intermediate buffer arrays 358 and 359, and bus 360. Output data is advanced from buffer array 358 to buffer array 359 via bus 361. Input data (received at interfaces 350) is passed from the IOR's to the central complex via bus 353, array 359, bus 362, array 358 and bus 363. Transfers between arrays 358 and 359 and either the central processing equipment or the IOR's are controlled by not-shown discrete sequence control circuits, separate from the controls 10, which are not relevant to this description. Such transfers are paced by the occupancy status of the larger buffer 359.

The buffer 359 is divided into eight 256-byte portions, one for each channel. The controls 10 are microprogrammed to keep track of the occupancy status of the discrete channel portions of buffer 359, to furnish main storage address information for each transfer relative to main storage, and to perform the housekeeping functions associated with such transfers (updating of main storage address and remaining byte count functions). Particulars of these operations will be described later with reference to FIG. 12.

The address information and associated status information are kept in local store 12.1. The discrete controls periodically examine a bit in each channel's LS portion, via bus 364, and conditionally transfer the associated control information to buffer 358 (via bus 364) when the bit is on, and initiate appropriate storage transfer request operations relative to main storage. If data is being sent to main storage (read operation) the data is accumulated in buffer 359, and then forwarded in double word units to main storage (with appropriate request and address information) via bus 363. When a transfer is completed the associated status information is returned to LS via bus 365, including a "completion bit" indicating the complete status. The controls 10 are microprogrammed to repeatedly test completion bits for each channel engaged in data transfer activity, and resume the status monitoring function when appropriate.

At the channel interfaces information for controlling signalling operations (relative to the peripherals) are received from the controls 10 via the eight "Control Out Registers" COR0-COR7 shown at 366, and incoming control and tag signals are effectively applied to the controls 10 via the "Control Input Registers" CIR-0-CIR7 shown at 367. The CIR registers 367 and their associated ingates shown at 368 correspond to the CIR's and IG's shown in FIG. 8 and discussed previously (as elements of the access control circuits 32 of the address storage memory 30 in controls 10). Other parts of the access controls 32 shown in FIG. 8 are indicated generally at 32' in FIG. 11.

Output tag signals (Select Out, Service Out, etc.) are passed to the COR's from control memory CM2, via OR2 (FIG. 1), not-shown delay latches, a common bus 370, and (implied) separate gates to the individual COR's. Similarly, inbound tag functions (Select In, Service In, etc.) are forwarded via the CIR's to the addressing controls 32' (refer also to FIG. 8) via shared bus 371.

The channel control circuits 354 receive control functions placed in the COR's via buses 372 and translate such into interface control signals which control the transfer clocking (tagging) of data and other control actions relative to the peripheral control units and devices. Inbound tag and control signal functions are passed to the CIR's, via individual buses 373, latches CB (FIG. 8), and ingates 368. Such functions are converted in transit to the CIR's into addressing functions for addressing level locations in memory 30 as described previously.

Figure 12A:
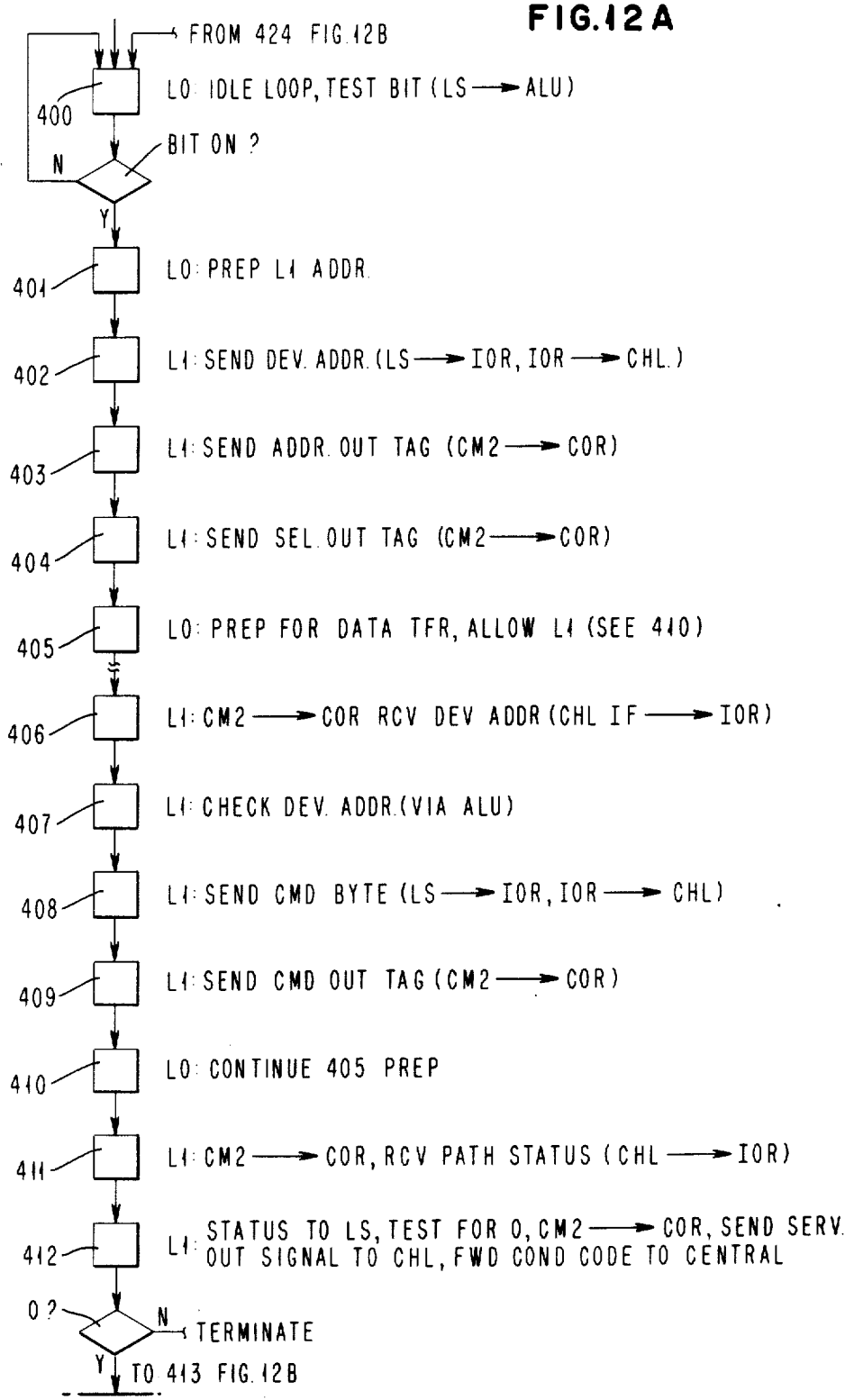
FIGS. 12A and 12B contain a sequence flow diagram for explaining I/O channel operations performed by the apparatus shown in FIG. 11.
Figure 12B:
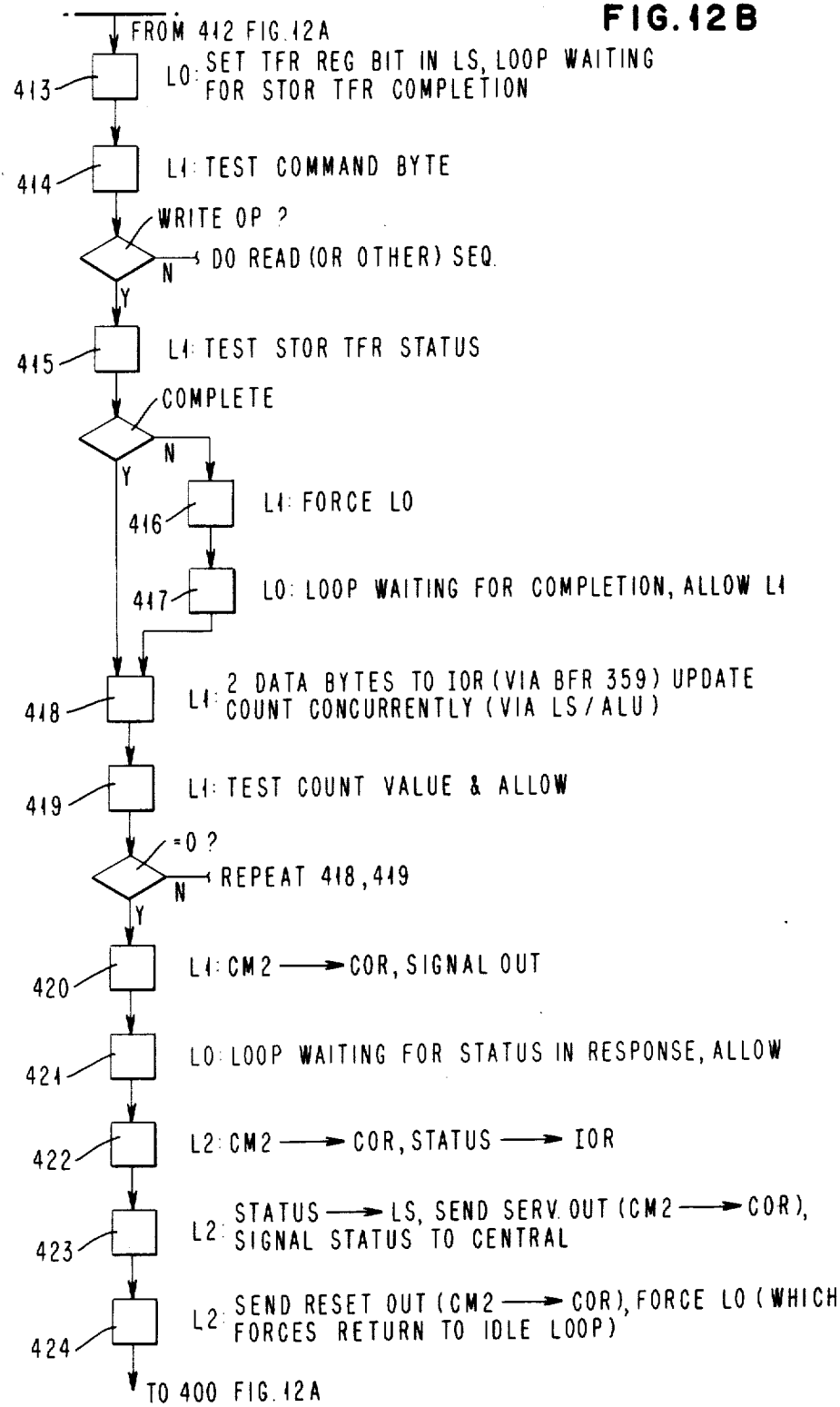

FIGS. 12A and 12B describe how an outbound (write) data transfer operation is conducted relative to a single one of the channel interfaces 350 (FIG. 11) under control of the subject apparatus. After the following explanation of these operations, which are indicated in an abbreviated form in FIGS. 12A and 12B, an explanation will be given of the form and functions of typical microinstructions in CM1-CM3 which control portions of these operations, and thereby inform those skilled in the art of the technique used to microprogram the entire operation. Operational sequences 400-412 discussed below are shown in FIG. 12A and sequences 413-424 are shown in FIG. 12B.

After initialization of subject control apparatus 10, for instance by the procedures described previously, the (time multiplexed) control functions of network 10 for the individual channels operate initially in level 0 ("L0") in an "idling loop" 400. In this loop the controls for an exemplary channel (which is the only channel considered in the following discussion) operate in (three minor cycles of) each major cycle to examine a control bit in LS via ALU 14.1 (FIG. 1). The examined bit is settable by central interfacing circuits to indicate I/O initiation activity (e.g. in association with central execution of a Start I/O instruction), and subsequent operations are conditioned on the examined bit value.

If the examined bit value is 0 the controls continue repeat idling function 400 (in the next major cycle), but if the bit is a 1 (indicating central initiation of an I/O operation) L0 operation 401 is performed to transfer an associated control address function (set into LS by the central interfacing circuits) from LS into the associated L1 storage position in Memory 30 (via the ALU and path 109, FIG. 5). This action, accompanied by forcing of the associated CIR register (FIGS. 8 and 11) to a state for addressing the associated L1 location (in the next major cycle), evokes L1 sequence 402-409 (FIG. 12A) for controlling an initial device selection signalling sequence at the associated channel interface 350 (FIG. 11).

In operations 402 (extending over several major cycles) device address information in LS (prepared by the above-mentioned central interfacing apparatus) is transferred to the associated IOR register (FIG. 11) and from that register to latches connecting to outbound data bus lines of the associated channel interface 350. In operations 403 signals sent from control memory CM2 to the associated COR register (FIG. 11) operate to control the associated channel interface circuits to present an "Address Out" tag signal on the "Address Out" tag line of the associated interface (the above-mentioned outbound data bus and address out tag lines, as well as other interface lines mentioned hereafter, are elements of contemporary channel interface systems, which are described for instance in IBM publication GA 22-6974 "IBM System/370 I/O Interface Channel to Control Unit Original Equipment Manufacturer's Information", and are presently familiar to those skilled in the I/O channel arts). In operations 404 signals again issuing from CM2 (one major cycle after the signals associated with operations 403) are latched in the associated COR and condition the associated channel circuits to present "Select Out" tag signal on the associated interface Select Out line (which, in accordance with conventional procedures is overlapped in time with the above-mentioned presentations of device address and address out tag signals).

The final control word of L1 operation 404 above sets the ALLOW latch condition (FIG. 8), permitting the associated control bus function CB (FIG. 8) to be gated into the associated CIR (FIG. 8). Until a response is received at the interface the CB function has the value 00 which causes the CIR to access L0 positions in memory 30 in following major cycles. This evokes a preparational sequence, for setting up a data transfer operation, which extends over many major cycles and is interruptable at any major cycle break point when a response is received at the interface. The ALLOW condition remains enabled and when a response is received the CB function is set to 01 causing CIR to address L1. This preparational sequence includes operations for evaluating the direction of transfer ("read" to main storage or "write" to the device) specified in the command (CCW) which has been prepared in LS. The following example assumes recognition of a write command operation.

As noted above receipt of a response signal at the interface sets up CIR to address an L1 location in the next major cycle. The normal response (by the device control unit) for continuation of the operation would comprise Operational In and Address In tag signals accompanied by ("data") signals representing the device address. Occurrence of this response evokes L1 sequence 406–409 for completion of device selection at any stage (minor cycle) of the preparational sequence. The information required for resumption of the preparational sequence, such resumption indicated at 410, is effectively stored in the associated L0 position of memory 30 and in associated locations in LS.

Operations 406 pass control information from CM2 to COR (FIG. 11) for controlling the channel to forward received device address information to the associated IOR (FIG. 11). Operations 407 forward the address from IOR to LS and through LS to the ALU together with information representing the intended address. These addresses are compared in the ALU to verify that they are identical. If they are, which they should be assuming no error, operation 408 is executed to transfer information representing the command byte function out to the interface (from LS via IOR) and operation 409 is performed to cause an overlapping Command Out tag signal to be sent over the interface.

Operation 409 allows a return from L1 to L0 (via path 206, FIG. 8) whereupon the preparation sequence interrupted at 405 resumes at 410. The ALLOW condition remains enabling during this resumption pending reception of a Status In response at the interface (to the Command Out signal of operation 409). When this response is received an interruption is again taken to L1 and sequence 411–412 is performed relative to this response.

Operation 411 conditions COR (via CM2) to cause the associated channel to forward incoming status byte information (received with Status In) to the associated IOR. Operations 412 pass this information from IOR to the ALU (via LS), where its value is tested, an associated condition code is signalled to the central equipment and Service Out is signalled to the device (via COR). If the tested status byte value is other than 0, indicating an inaccessible or busy device, the command operation is concluded (without any data transfer). However if the value is 0, and assuming a write command, operations 412 actuate the channel interface controls to request forwarding of 2 bytes of data (from buffer 359) for "Write" transfer over the interface. In the latter circumstance, L0 is re-entered at 413 for continuing the preparational sequence, which now sets a transfer request bit in LS for examination by the not-shown central interfacing circuits. This actuates said circuits to transfer the required data from main storage to buffer 359 via buffer 358.

After setting the transfer request bit, the preparational sequence enters a "loop", waiting for completion of the requested data transfer (to buffer 358), in which a "completion" bit in LS is examined repeatedly. This bit, settable by the aforementioned central interfacing circuits, indicates when the transfer from main store to buffer 359 is completed.

While L0 operations 413 are being conducted the device controller will eventually (in normal circumstances) respond with Service In to the Service Out tag sent earlier during L1 sequence 412.

When received, this response conditions CIR, via CB (FIG. 8) to address L1 and invoke operation 414 for testing the command byte and determining if it is specifying a Read or Write operation (up to this point the direction of the data transfer had been ascertained only by the L0 preparational sequence and not by the L1 operational signalling sequences). Continuing with the assumption that a write operation is in process, operation 414 is followed by a branch to L1 operation 415 for examining the above-mentioned completion bit in LS, and thereby determining if the requested data transfer has been completed relative to buffer 359. If the transfer is not complete entry to L0 is forced at 416 (actually part of operation 415 timewise) and ALLOW is disabled to keep L0 in control. At this point the L0 sequence continues at 417 in the waiting loop entered during operations 413 (for detecting storage transfer completion) and reenables the ALLOW function when completion is detected.

Activation of the ALLOW condition enables the outstanding data byte transfer request at the channel (see discussion of operations 412 above) to control the CIR, via the CB latches (FIG. 8) to address L1. This evokes data transfer sequence 418–420 for transferring data from buffer 359 to the channel interface two bytes at a time (via IOR). Concurrent with each transfer the L1 controls operate at 418 to update a "remaining byte count" parameter in LS and test its value (via LS and ALU).

If the remaining byte count value is not 0, indicating that more bytes are to be transferred, the L1 sequence repeats operations 418 and 419 whenever the interface controls signal for more data (Service In or Data In). When the count value equals 0, the sequence branches to concluding sequence 420–424.

Concluding operation 420 is performed in L1 to cause the channel to signal completion of the data transfer part of the operation at the interface, and then L0 is re-entered at 421 to trace another waiting loop waiting for further channel interface response activity associated with status communication. During sequence 421 ALLOW remains enabling so that when the interface response is received control is transferred to L2 sequence 422–424 (by transfer of a "10" level 2 address through the associated CB and CIR, FIG. 8). Operation 422 of this sequence passes the received status byte from the channel to LS (via IOR). Operations 423 cause a Service Out signal to be sent to the device (as a response to the Status In signal) and an indication to be given to the central system of the presence of concluding status in LS. Operation 424 causes a reset signal to be passed to the channel interface controls, and finally enters a 00 condition in CIR which forces a re-entry to L0 at idle loop 400 (FIG. 12A).

An example is now given of how control words in CM1–CM3 are specifically composed and translated relative to operations described above.

Each 9 bit control word function in CM1 is organized into three (separately decoded) control fields: A five-bit addressing field for readout addressing of one of the 32 word locations in LS 12.1, a two-bit gating field for gating the selected output of LS to one of the registers 12.3 (FIG. 1), and a two-bit field for controlling gating from LS to IOR and 2048 byte buffer 359.

CM2 control functions have eight separately decoded fields as follows: a four-bit "ALU gating" field for gating from registers 12.3 to left and right side inputs of ALU 14.1; a four-bit "ALU function" field defining the function to be performed in the ALU (add, AND, OR, etc.); a five-bit "emit" field for injecting data directly into the ALU from CM2 (e.g. for transfer into memory 30 via path 109 FIG. 5); a two-bit "additional ALU function" field for supplementing the ALU function field; a two-bit ALU outgating field for steering ALU outputs to registers 14.4 (FIG. 1), e.g. for alignment with specific outbound destinations); a four-bit "miscellaneous" field for various functions (e.g. steering the "emit" field to COR, FIG. 11); a three-bit "sequence number" field for transfer to memory 30 (via path 127 FIG. 6, in contrast to the sequence number "functions" shown at 135 in FIG. 6 which are derived from the decoded outputs of CM1-CM3); and a three-bit "activity level" control field for application to the CIR registers (via path 206, 207 FIG. 8).

CM3 control words have five decodable fields as follows: a five-bit "channel location selecting" field which defines a group of 32 word locations in LS into which a word of information is to be written; a four-bit "byte location selecting" field which specifies a single byte space, within the group of locations defined by the channel location selecting field, as the LS writing destination; a three-bit "next address" field specifying a part of the next address to be written into memory 30 (via path 107 FIG. 4); and two three-bit "A branch" and "B branch" control fields for entry into memory 30 (via path 105, FIG. 5).

Now referring, for example, to the idle loop 400 in FIG. 12A, the value of the initiation activity bit set into LS by the central interfacing circuits (in particular into bit 7 of LS word 7 for the respective channel) is tested as follows:

(1) In one minor cycle the ti output of timing circuits 26 (FIG. 1) and the CM1 addressing field respectively address a channel group of word locations in LS, and a particular word location (word 7) in that group, for readout (2) The "activity indicating" word readout of LS, which is either all 0's or a 1 in bit 7 and all 0's in other bits, is gated into 12.3 (in the same cycle) under control of the CM1 gating field (3) In the next minor cycle the activity word function staged in 12.3 is injected into the left side of ALU 14.1, under control of the CM2 ALU gating field, while a bit from the CM2 emit field is gated into the bit 7 position of the right side of the ALU and while the CM2 function field specifies an "AND" operation. The ALU result output produced in this cycle is transferred to one of the registers 14.4, under control of the CM2 ALU outgating field (4) In the next minor cycle the CM3 A branch field gates information into the L0 location in memory 30 reflecting whether the ALU output in 14.4 is or is not all 0's, thereby causing either a repetition of operation 400 (FIG. 12A) or advancement to operation 401 (FIG. 12A).

While we have illustrated and described preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. A pipelined processor for executing processes for one or more activity levels for each of a plurality n of channels of a data processor, wherein an activity level is an independent task of a channel that may be executed concurrently with other tasks of the channel, comprising, a plurality m of processor stages, including a first stage and a last stage, means interconnecting the stages to perform successive steps of executing a process for a channel, each stage including a control memory for controlling the execution of the process, means interconnecting the stages to form a pipeline for data, and means interconnecting the stages for shifting a control memory address from the first stage through the last stage in step with the execution of the corresponding process, wherein the improvement comprises, means for establishing time division slots, designated minor cycles, for operations for each channel in a predetermined sequence of channels an address storage array for holding an address for each activity level of each channel process, and means for fetching an address for each processes in a fixed sequence of said channels and supplying the process address to the control memory for the first stage, wherein said means for supplying address signals to said control memories comprises:

means in said address storage array for storing at least n address functions for addressing locations in said control memories;

means for reading said address functions out of said address storage array cyclically for each of the minor cycles; address functions successively read out of said address storage array being associated with successive ones of said n channel processes and means for applying each address function read out of said array serially, in successive minor cycles, to said control memories, whereby different ones of said control memories hold address functions for different processes, means for cyclically entering addresses into said array according to operations to be performed and in a predetermined sequence that includes each process, a cycle of n channel processes being designated a major cycle.

2. Control apparatus in accordance with claim 1 wherein at least two of said control memory arrays are dimensioned differently so as to store control words having comparatively different bit lengths.

3. Apparatus in accordance with claim 1 including:

means for writing address functions into predetermined locations in said address storage array cyclically, in each minor cycle, while address functions are being read out of other locations in said address storage array; and address source select means coupled to said data pipeline and said control memories for receiving addresses and coupled to said writing means for supplying addresses to be written into said array in varying functional association with operations currently being performed relative to each of said n processes.

4. Apparatus in accordance with claim 3 wherein said address source select means is also coupled to said means for applying said addresses to said control memories, whereby an address written into said address storage array may also be varied in association with addresses currently being applied to said control memories.

5. Apparatus in accordance with claim 3 wherein:

said address storage array includes means to store address functions pertaining to plural different activities of each of said n processes; and said means for reading and said means for writing said address functions include means to write address functions for each process which are for the same activity as the address function last previously read out for the same process, whereby any operation currently being performed in said data pipeline relative to any process can be interrupted to permit servicing of another activity relative to the same process, and the interrupted activity can be subsequently resumed simply by reading out the last address written into said address storage array relative to that activity.

6. Apparatus in accordance with claim 3 wherein said address storage array is partitioned into two half sections, said apparatus including:

means for separately addressing both of said sections in each cycle of operation of said address storage array;

means for producing counting signals distinguishing alternate cycles of operation of said address storage array as odd and even cycles; and wherein said reading means includes means cooperative with said counting means and said separate addressing means for causing a predetermined location in one of said sections to be read out in each odd cycle end a predetermined location in the other of said sections to be read out in each even cycle; and said writing means includes means cooperative with said counting means and said separate addressing means for causing a predetermined location in said other section to be written in each odd cycle and a predetermined location in said one section to be written in each even cycle.

7. Apparatus in accordance with claim 6 wherein said separate addressing means includes:

first and second registers for respectively addressing locations in said one and said other sections;

means coupled to said first and second registers for cyclically supplying partial address functions to predetermined parts of said first and second registers for designating groups of locations in each one and other sections; each said group being dedicated to a predetermined one of said processes and including plural locations dedicated to different activity functions of the process channel;

n/2 first registers for storing partial addresses designating activity locations in said one section, and n/2 second registers for storing partial addresses designating activity locations in said other section;

means for supplying activity address information cyclically to said n/2 first registers and said n/2 second registers; and means for transferring activity address information from selected ones of said n/2 first and n/2 second registers, in each cycle of operation of said address storage array, respectively to said first and second registers for supplementing group address information supplied to said first and second registers from said means for supplying group designating partial addresses, and thereby enabling said first and second registers to each address a single predetermined location in said respective one and other sections in each cycle of operation of said array.

8. Control operation in accordance with claim 6 wherein said means for separately addressing includes:

means coupled to said address storage array, cooperative with said means for writing and said means for reading, for accessing predetermined locations in said one and said other sections and thereby causing address functions to be written into and read out of different locations in said one address storage and other sections of said array simultaneously in each of said cycles; said functions simultaneously written into and read out of said array pertaining to different ones of said n processes and being situation at locations in said sections dedicated to respective processes; and means coupled to said location accessing means for supplying pairs of location defining functions to said accessing means for defining locations in said sections relative to which address functions are to be simultaneously written in and read out.

* * * * *